(12) United States Patent
Fenton et al.

(10) Patent No.: US 10,928,854 B1
(45) Date of Patent: *Feb. 23, 2021

(54) PORTABLE ELECTRONIC DEVICE CASE

(71) Applicant: Pioneer Square Brands, Inc., Seattle, WA (US)

(72) Inventors: Timothy John Fenton, Mercer Island, WA (US); Michael Cooper Ferren, Camas, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,727

(22) Filed: Nov. 5, 2020

Related U.S. Application Data

(63) Continuation-in-part of application No. 15/947,773, filed on Apr. 6, 2018, now Pat. No. 10,838,455.

(51) Int. Cl.
   *G06F 1/16* (2006.01)
(52) U.S. Cl.
   CPC .................. *G06F 1/1628* (2013.01)
(58) Field of Classification Search
   CPC ....................................................... G06F 1/1628
   See application file for complete search history.

(56) References Cited

U.S. PATENT DOCUMENTS

| | | | | |
|---|---|---|---|---|
| 6,267,236 B1 * | 7/2001 | Seok | ..................... | A45C 13/002 206/320 |
| 8,763,795 B1 * | 7/2014 | Oten | ....................... | A45C 11/00 206/45.23 |
| 8,997,983 B2 * | 4/2015 | Sajid | ..................... | G06F 3/0208 206/320 |
| 2006/0060485 A1 * | 3/2006 | Picot | ........................ | A45C 5/00 206/320 |
| 2006/0226040 A1 * | 10/2006 | Medina | .................. | G06F 1/1616 206/320 |
| 2010/0110629 A1 * | 5/2010 | Dietz | ..................... | A45C 11/00 361/679.55 |
| 2012/0037285 A1 * | 2/2012 | Diebel | .................. | G06F 1/1628 150/165 |
| 2012/0118773 A1 * | 5/2012 | Rayner | ................ | H05K 5/0004 206/320 |
| 2013/0214661 A1 * | 8/2013 | McBroom | ............... | G06F 1/162 312/325 |

(Continued)

*Primary Examiner* — Rockshana D Chowdhury
(74) *Attorney, Agent, or Firm* — Grandview Law

(57) ABSTRACT

Systems and methods are involved with but are not limited to a portable electronic device case including a device display receiving portion, a device keyboard receiving portion, and a spine portion extending therebetween, the spine portion having a flexibility sufficient to accommodate hinged disposition between the device display receiving portion, and the device keyboard receiving portion, the spine portion including at least one pair of stops including a first stop and a second stop being positioned to be oppositely facing when the portable electronic device case is in a closed disposition to allow for contact between the first stop and the second stop to maintain spacing between one or more portions of the device display receiving portion and one or more portions of the device keyboard receiving portion. In addition, other aspects are described in the claims, drawings, and text forming a part of the present disclosure.

20 Claims, 19 Drawing Sheets

(56) References Cited

U.S. PATENT DOCUMENTS

| | | | | |
|---|---|---|---|---|
| 2014/0191033 A1* | 7/2014 | Wojcik | H02J 7/0042 | |
| | | | 235/449 | |
| 2015/0041341 A1* | 2/2015 | Marshall | G06F 1/1633 | |
| | | | 206/45.2 | |
| 2015/0097009 A1* | 4/2015 | Burgess | H04B 1/3888 | |
| | | | 224/191 | |
| 2015/0108186 A1* | 4/2015 | Law | A45C 11/00 | |
| | | | 224/191 | |
| 2015/0195929 A1* | 7/2015 | Roberts | H04B 1/3888 | |
| | | | 428/35.7 | |
| 2016/0338459 A1* | 11/2016 | Yow | A45C 13/02 | |
| 2017/0013925 A1* | 1/2017 | Fathollahi | A45C 13/02 | |
| 2017/0105292 A1* | 4/2017 | Kuzmenko | A45C 5/02 | |

\* cited by examiner

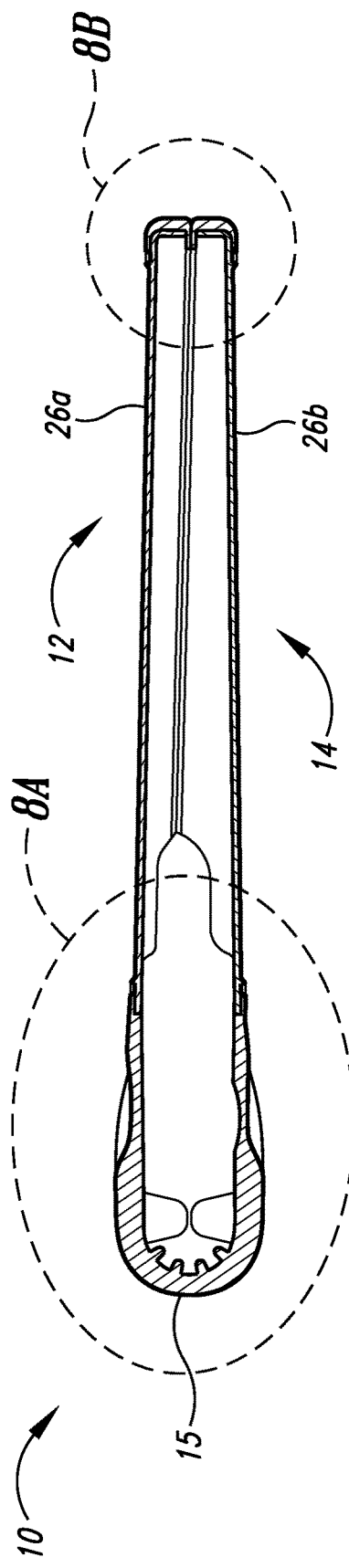
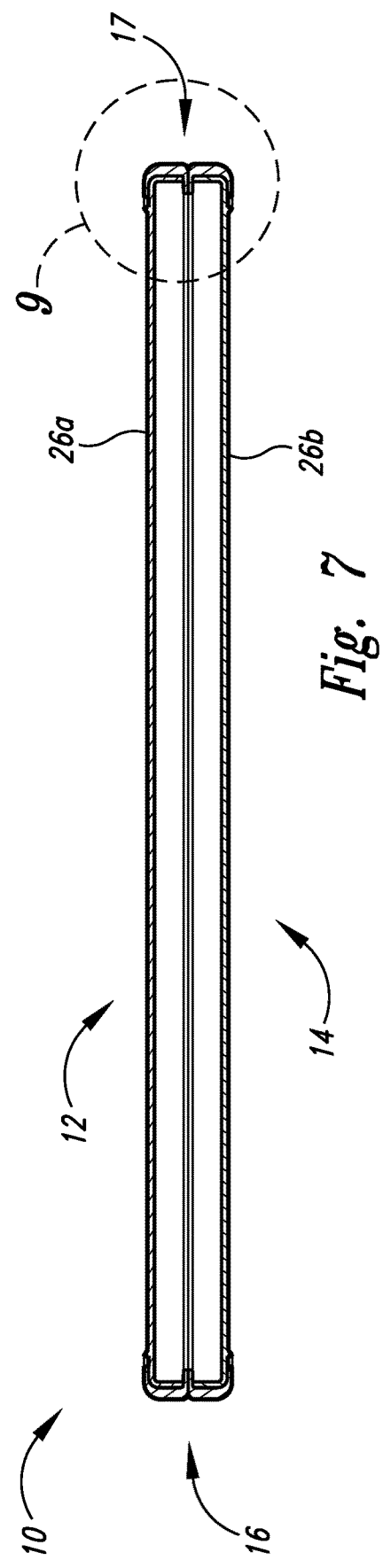

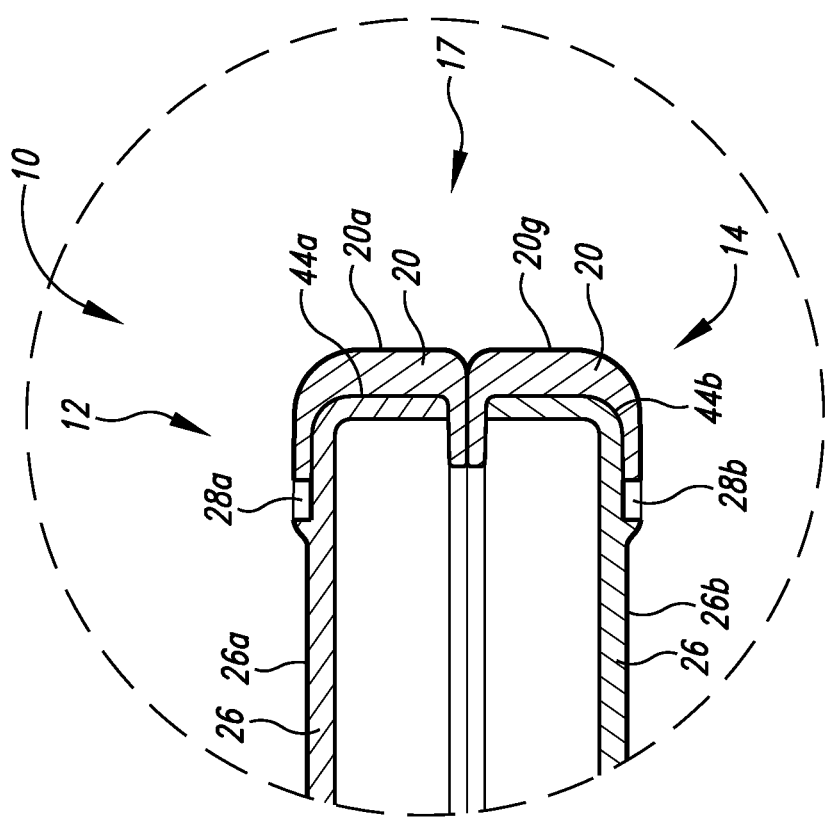
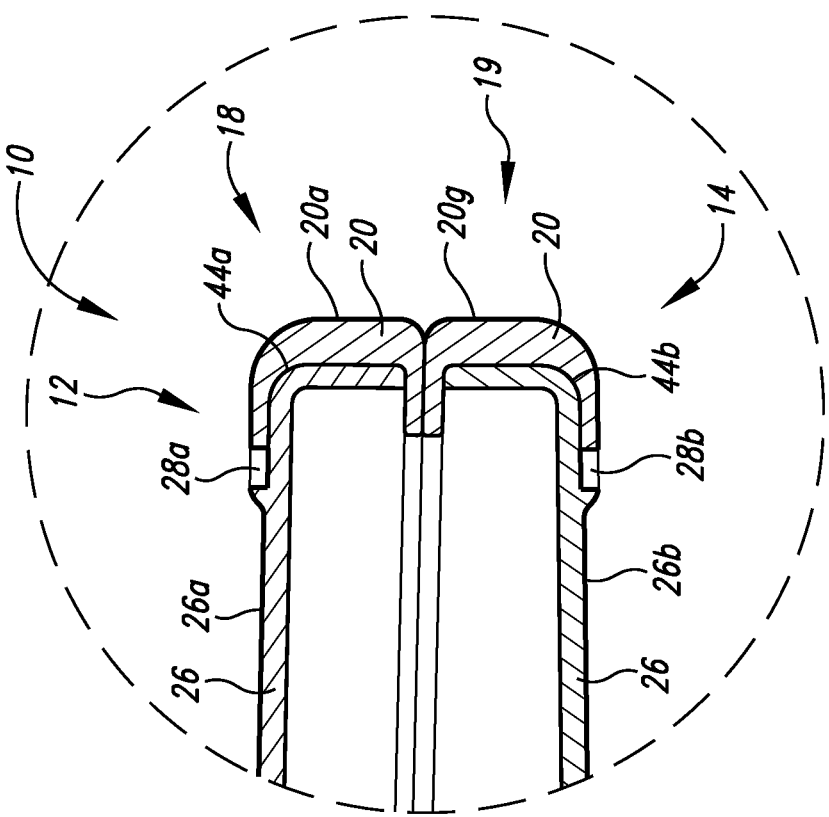

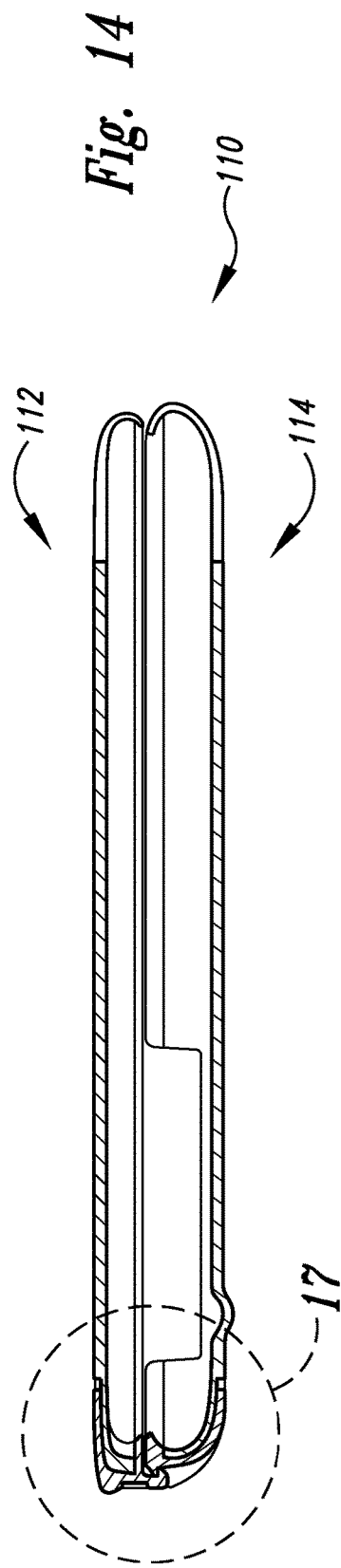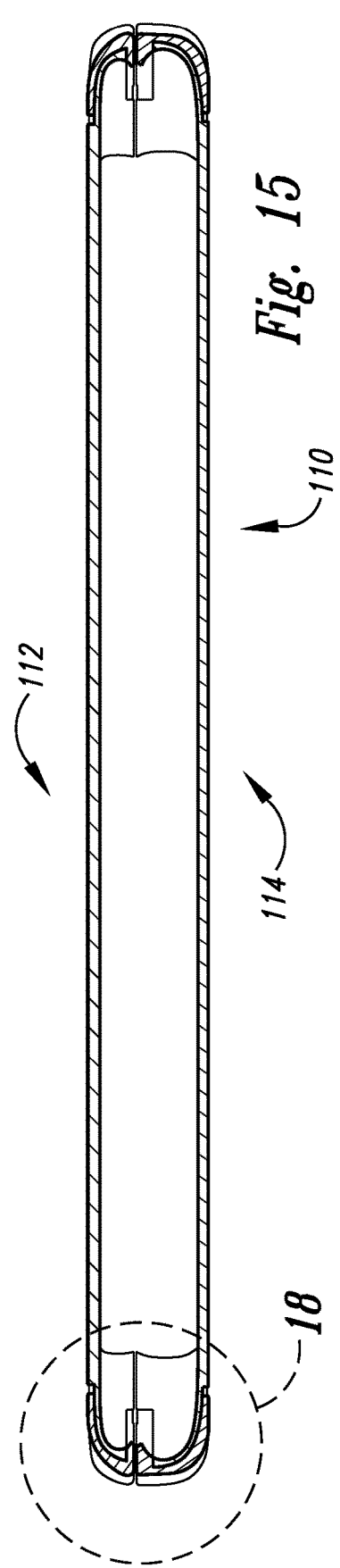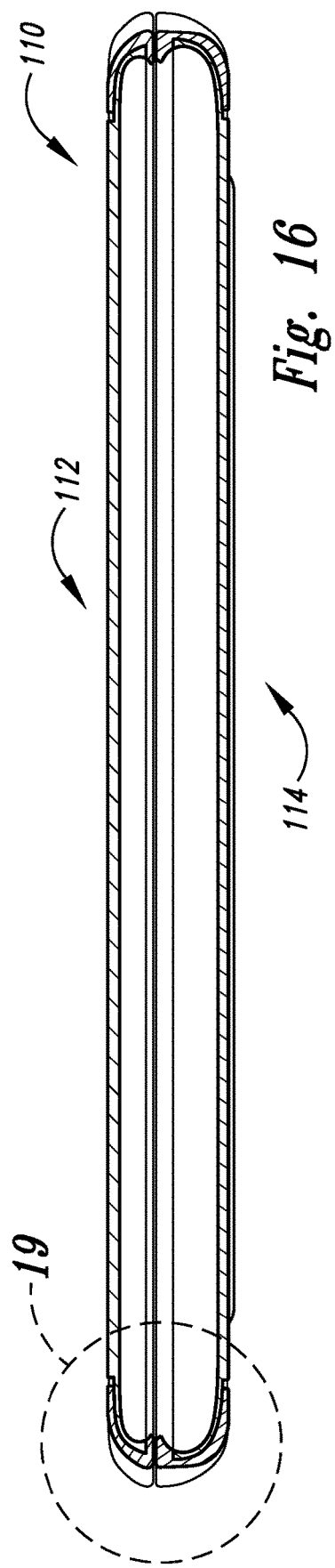

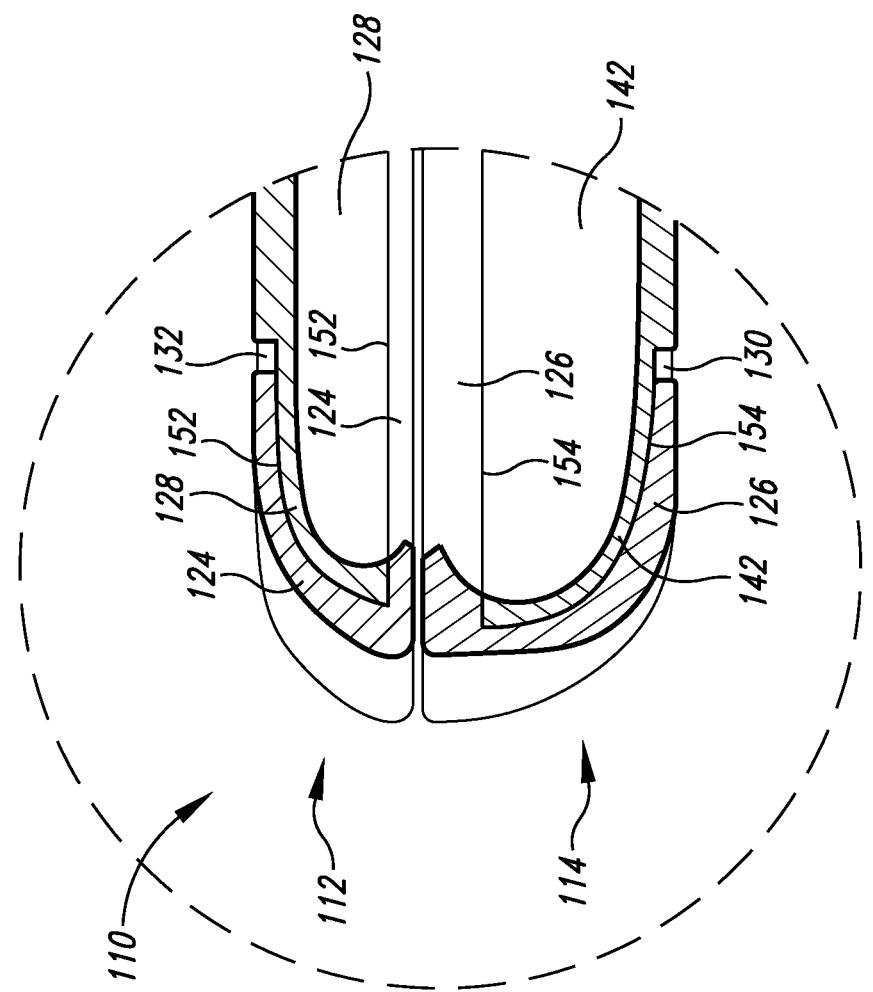

PORTABLE ELECTRONIC DEVICE CASE

SUMMARY

In one aspect, an apparatus includes, but is not limited to a semiflexible plastic piece including a device display receiving portion, a device keyboard receiving portion, and a spine portion extending therebetween, the device display receiving portion sized and shaped to receivably couple along one or more edges of a display portion of a portable electronic device, the device keyboard receiving portion sized and shaped to receivably couple along one or more edges of a keyboard portion of the portable electronic device, the semiflexible plastic piece having flexibility sufficient for the spine portion to accommodate hinged disposition between the display portion and the keyboard portion of the portable electronic device as received by the portable electronic device case. In addition to the foregoing, other method aspects are described in the claims, drawings, and text forming a part of the disclosure set forth herein.

In one aspect, an apparatus includes, but is not limited to a portable electronic device case including a device display receiving portion, a device keyboard receiving portion, and a spine portion extending therebetween, the spine portion having a flexibility sufficient to accommodate hinged disposition between the device display receiving portion, and the device keyboard receiving portion, the spine portion including at least one plurality of ribs and at least one pair of stops including a first stop and a second stop, the first stop and the second stop of the at least one pair of stops being larger in size than the at least one plurality of ribs, the first stop and the second stop of the at least one pair of stops being positioned to be oppositely facing when the portable electronic device case is in a closed disposition to allow for contact between the first stop and the second stop of the at least one pair of stops to maintain spacing between one or more portions of the device display receiving portion and one or more portions of the device keyboard receiving portion.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of portable electronic device case based articles of manufacture, compositions of matter, systems for producing and/or methods for producing same that may provide context, for instance, in introducing one or more processes and/or devices described herein.

FIG. 6 is a cross-sectional side-elevational view along 6-6 cut line of FIG. 4 and FIG. 5 showing inner space bounded by interior portions of portable electronic device case in closed disposition.

FIG. 7 is a cross-sectional side-elevational view along 7-7 cut line of FIG. 4 and FIG. 5 showing inner space bounded by interior portions of portable electronic device case in closed disposition.

FIG. 8B is an enlarged cross-sectional side-elevational view of a dashed-circle-designated "8B" portion of portable device case of FIG. 6, which is a cross-sectional side-elevational view along 6-6 cut line of FIG. 4 and FIG. 5 showing inner space bounded by interior portions of portable device case in closed disposition.

FIG. 9 is an enlarged cross-sectional side-elevational view of a dashed-circle-designated "9" portion of portable device case of FIG. 7, which is a cross-sectional side-elevational view along 7-7 cut line of FIG. 4 and FIG. 5 showing inner space bounded by interior portions of portable device case while in its closed disposition.

FIG. 14 is a cross-sectional side-elevational view along 14-14 cut line of FIG. 12 and FIG. 13 showing inner space bounded by interior portions of portable electronic device case while in its closed disposition.

FIG. 15 is a cross-sectional side-elevational view along 15-15 cut line of FIG. 12 and FIG. 13 showing inner space bounded by interior portions of portable electronic device case while in its closed disposition.

FIG. 16 is a cross-sectional side-elevational view along 16-16 cut line of FIG. 12 and FIG. 13 showing inner space bounded by interior portions of portable electronic device case while in its closed disposition.

FIG. 19 is an enlarged cross-sectional side-elevational view of a dashed-circle-designated "19" portion of portable electronic device case of FIG. 16, which is a cross-sectional side-elevational view along 16-16 cut line of FIG. 12 and FIG. 13 showing inner space bounded by interior portions of portable electronic device case while in its closed disposition.

DETAILED DESCRIPTION

Figure 1:
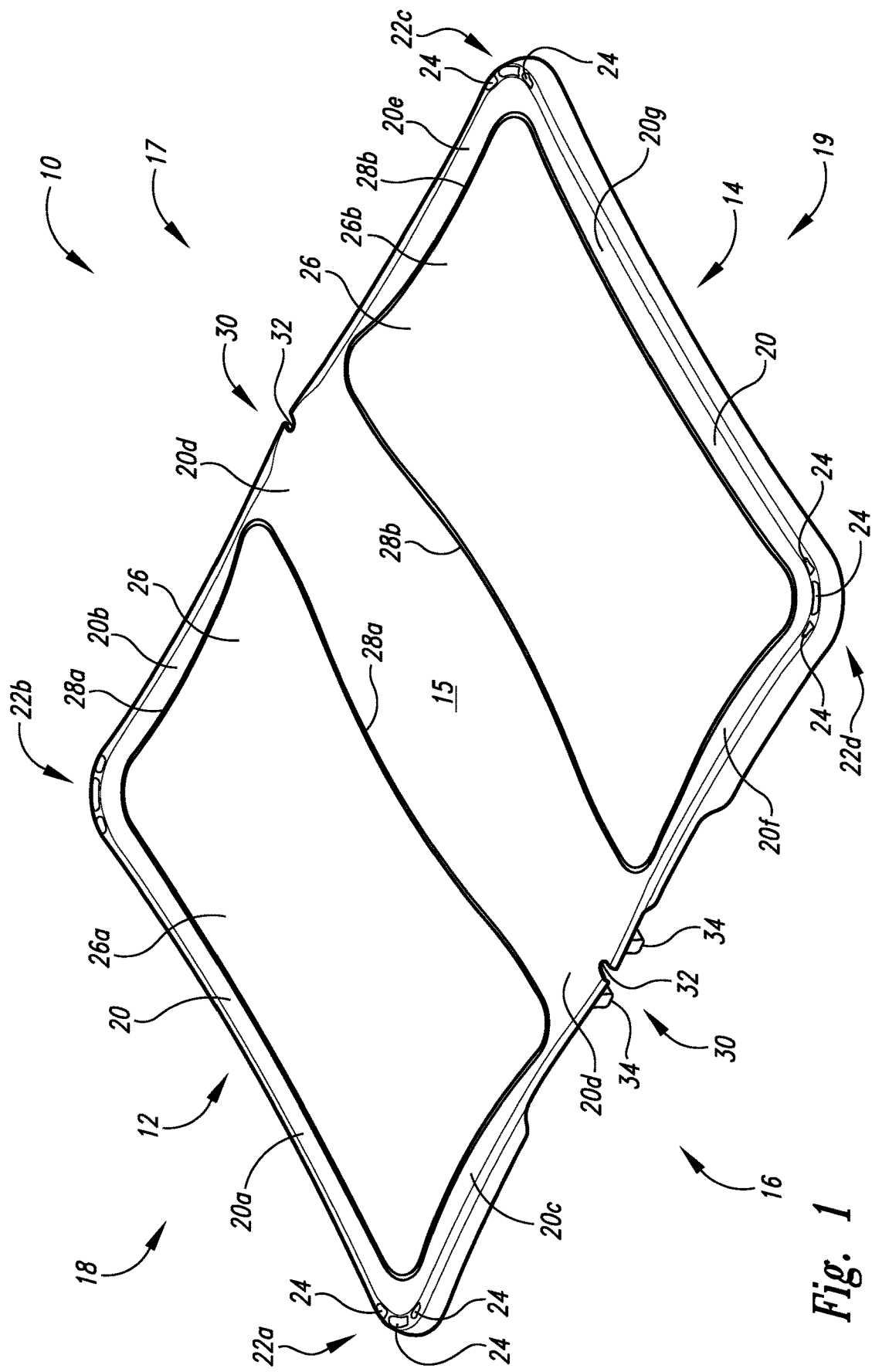
FIG. 1 is an exterior perspective view of a first embodiment of portable electronic device case in flat-open disposition.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Turning to FIG. 1, a first embodiment of portable electronic device case 10 is depicted in flat-open disposition to include device display receiving portion 12, device keyboard receiving portion 14, spine portion 15 therebetween, first side 16, second side 17, first end 18, and second end 19. Portable electronic device case 10 is made of a semiflexible plastic piece 20 that is molded as one piece to include first portion 20a, second portion 20b, third portion 20c, fourth portion 20d, fifth portion 20e, sixth portion 20f, and seventh portion 20g. First portion 20a and third portion 20c intersect at first corner 22a. First portion 20a and second portion 20b intersect at second corner 22b. Fifth portion 20e and seventh portion 20g intersect at third corner 22c. Sixth portion 20f and seventh portion 20g intersect at fourth corner 22d. First through seventh portions 20a-20g and first through fourth corners 22a-d of semiflexible plastic piece 20 are designated herein solely for illustration purposes regarding the Figures rather than being actual separate and distinct pieces of portable electronic device case 10 since semiflexible plastic piece 20 is molded as one piece.

Semiflexible plastic piece 20 can be a soft, flexible, plastic material such as thermoplastic polyurethane, thermoplastic elastomers (TPE), silicone or other soft plastic material, which provides shock absorption and textured surfaces for handling qualities. Semiflexible plastic piece 20 is also located in spine portion 15 and along first side 16, second side 17, first end 18, and second end 19, which are areas where portable electronic device case 10 would more likely first impact a hard surface if accidentally dropped and are also likely areas that would receive hand contact when held to allow for grip assistance due to a desirably enhanced tactile quality of semiflexible plastic piece 20. Cutouts 24 have a crumple-like character for first through fourth corners 22a-d that enhance shock absorption qualities of semiflexible plastic piece 20 in these locations.

Portable electronic device case 10 has semirigid plastic material 26 in first semirigid plastic panel 26a and second semirigid plastic panel 26b. Semirigid plastic material can be such as polycarbonate and can be transparent, translucent, semi-transparent, semi-translucent, opaque, or fully solid. First channel 28a is positioned between semiflexible plastic piece 20 and first semirigid plastic panel 26a. First channel 28b is positioned between semiflexible plastic piece 20 and second semirigid plastic panel 26b.

Figure 2:
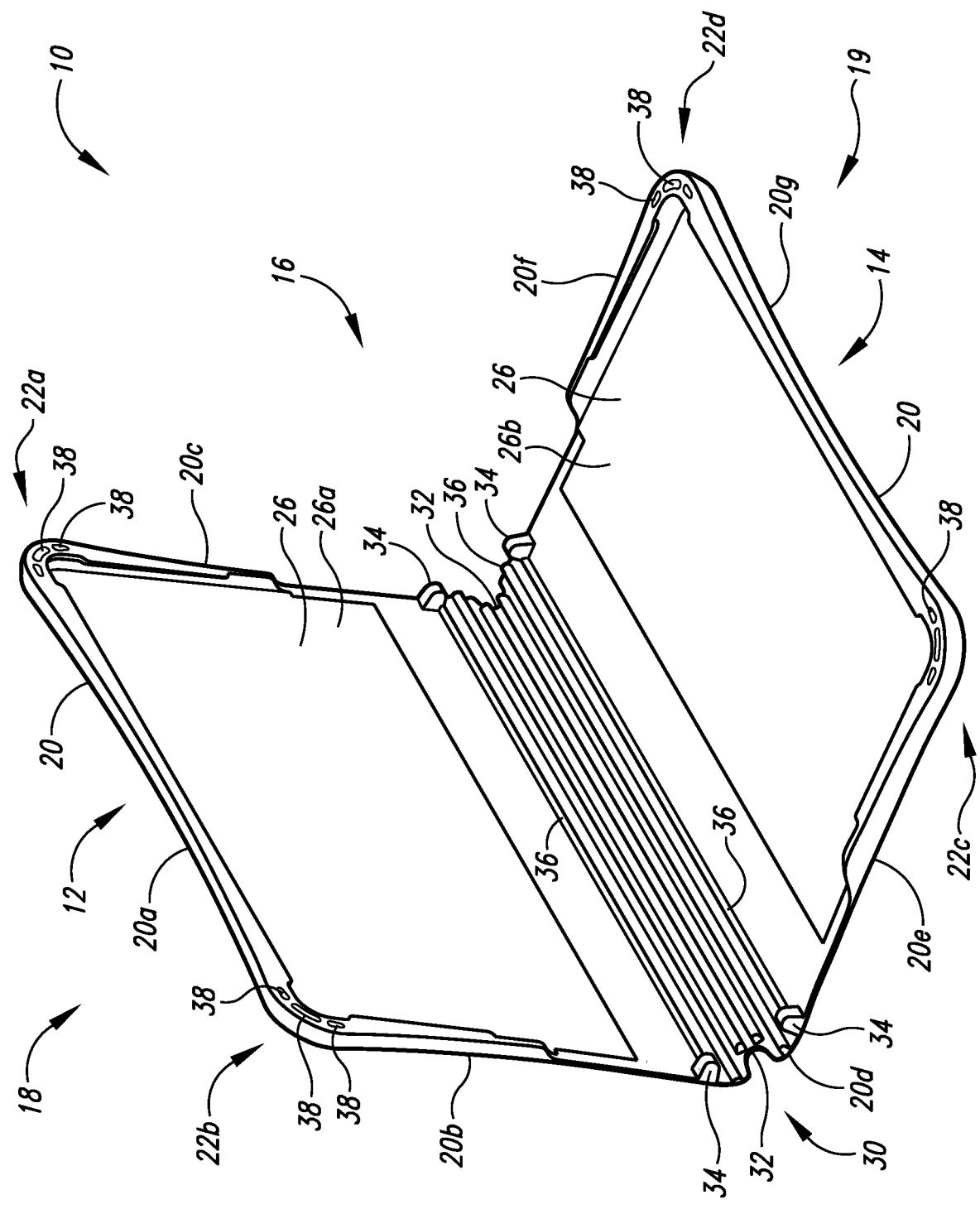
FIG. 2 is an interior perspective view of the portable electronic device case of FIG. 1 in angled-open disposition.
Figure 3:
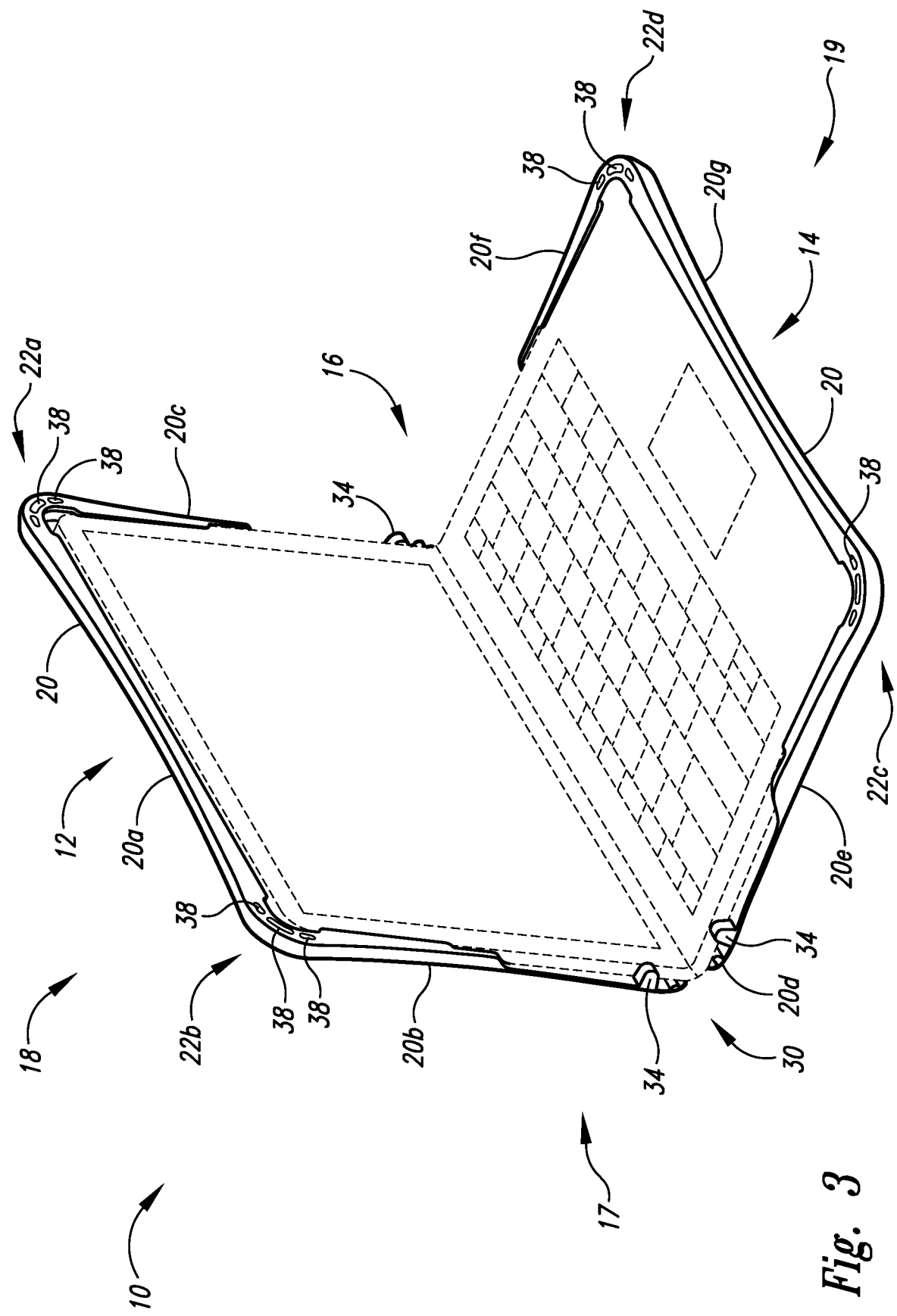
FIG. 3 is an interior perspective view of the portable electronic device case of FIG. 1 in angled-open disposition with an exemplary portable electronic device.
Figure 4:
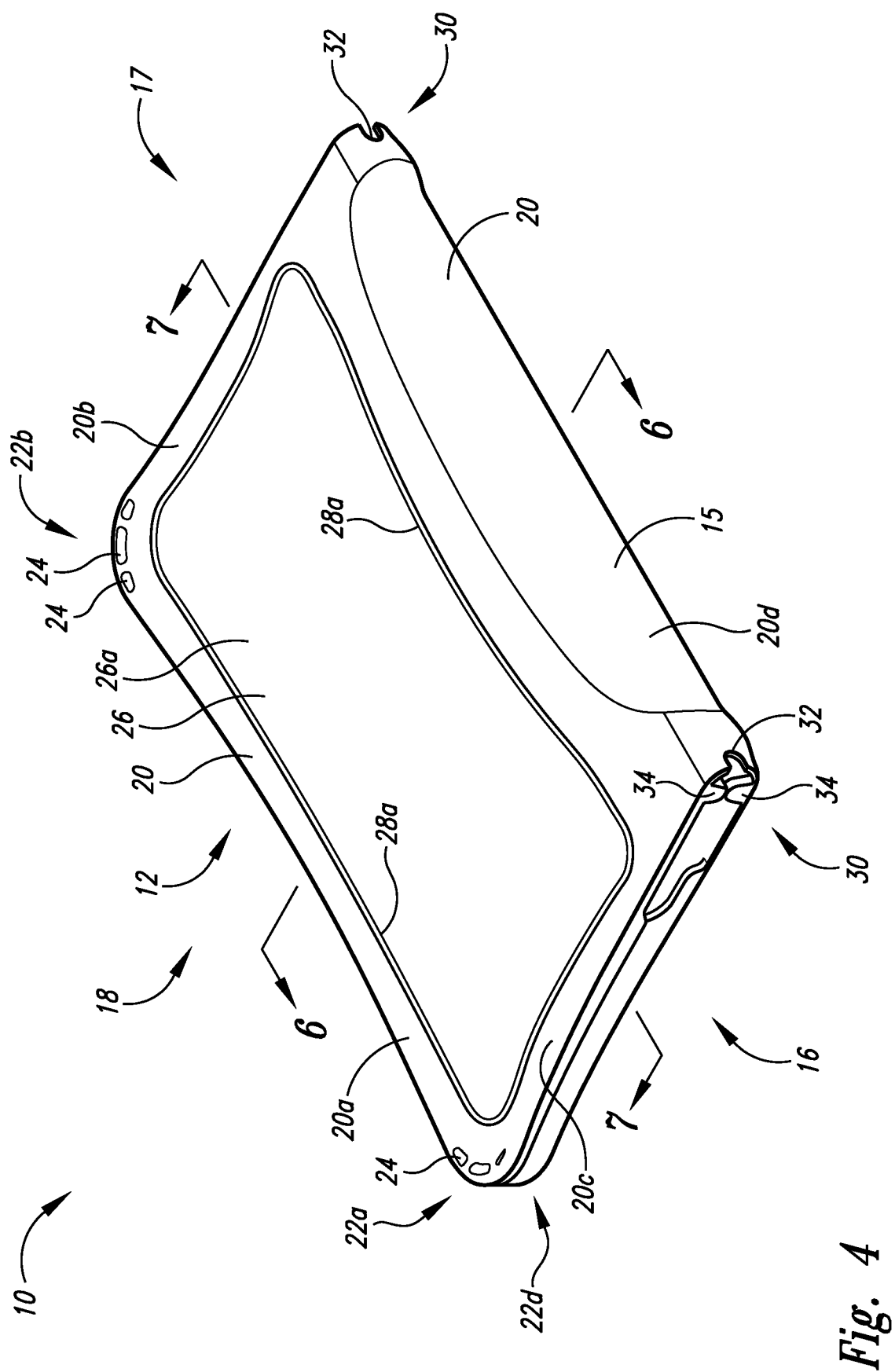
FIG. 4 is an exterior perspective view of the portable electronic device case of FIG. 1 in closed disposition.
Figure 5:
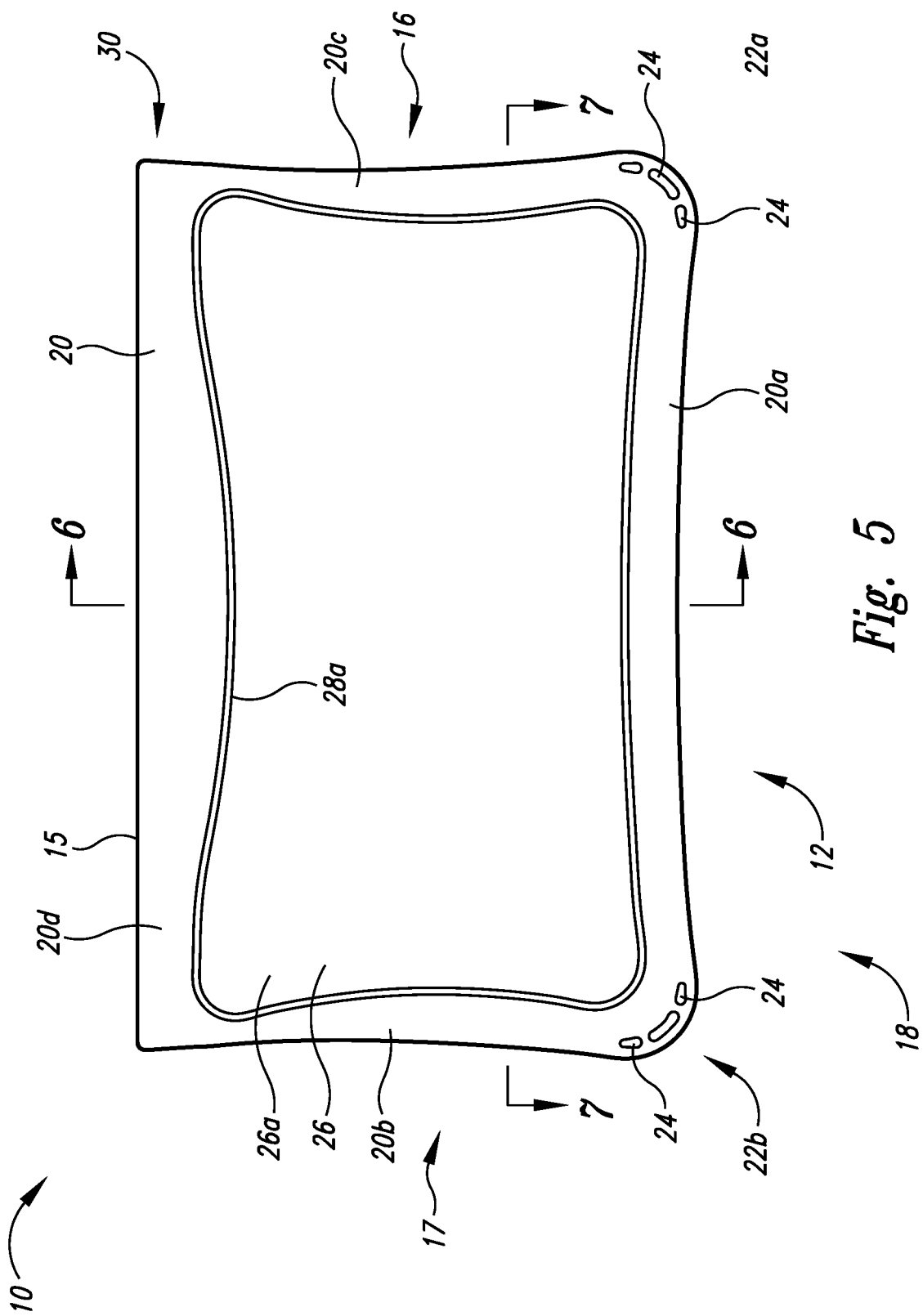
FIG. 5 is an exterior top plan view of the portable electronic device case of FIG. 1 in closed disposition.

Portions of hinge 30 include cuts 32 and stops 34 along with the flexible nature of semiflexible plastic piece 20 that make up fourth portion 20d, which constitutes the spine portion 15 of portable electronic device case 10 so consequently serves a flexibility role for hinge 30. Referring now to FIG. 2, hinge 30 further includes ribs 36 running along the spine of portable electronic device case 10 to provide cushion/protection to spine portion 15. First through fourth corners 22a-d include cutouts 38 for further shock absorbing qualities. First semirigid plastic panel 26a and second semirigid plastic panel 26b appear to be shaped differently than what is shown in FIG. 1 because there is more of semiflexible plastic piece 20 overlaid on to first semirigid plastic panel 26a and second semirigid plastic panel 26b on the exterior compared with the interior of portable electronic device case 10. Turning to FIG. 3, portable electronic device case 10 is shown in angled-open disposition with an exemplary portable electronic device shown as a laptop with a display portion and a keyboard portion hingedly disposed therebetween. Device display receiving portion 12 and device keyboard receiving portion 14 of the semiflexible plastic piece 20 are shown sized and shaped to receivably couple along edges of the display portion and of the keyboard portion of the exemplary portable electronic device, respectively. The semiflexible plastic piece 20 is shown to have flexibility sufficient for the spine portion 15 to accommodate hinged disposition between the display portion and the keyboard portion of the exemplary portable electronic device. Referring now to FIG. 4, portable electronic device case 10 is shown in closed disposition in an exterior perspective view. Turning to FIG. 5, portable electronic device case 10 is shown in closed disposition in an exterior top plan view.

Referring now to FIG. 6, portable electronic device case 10 is shown in cross-sectional side-elevational view along 6-6 cut line of FIG. 4 and FIG. 5 showing inner space bounded by interior portions of portable device case in closed disposition. Two opposite facing stops 34 are depicted as providing support to prevent shape collapse of the semiflexible plastic piece 20 in their vicinity. Turning to FIG. 7, portable electronic device case 10 is shown in cross-sectional side-elevational view along 6-6 cut line of FIG. 4 and FIG. 5 showing inner space bounded by interior portions of portable device case in closed disposition.

Figure 8A:
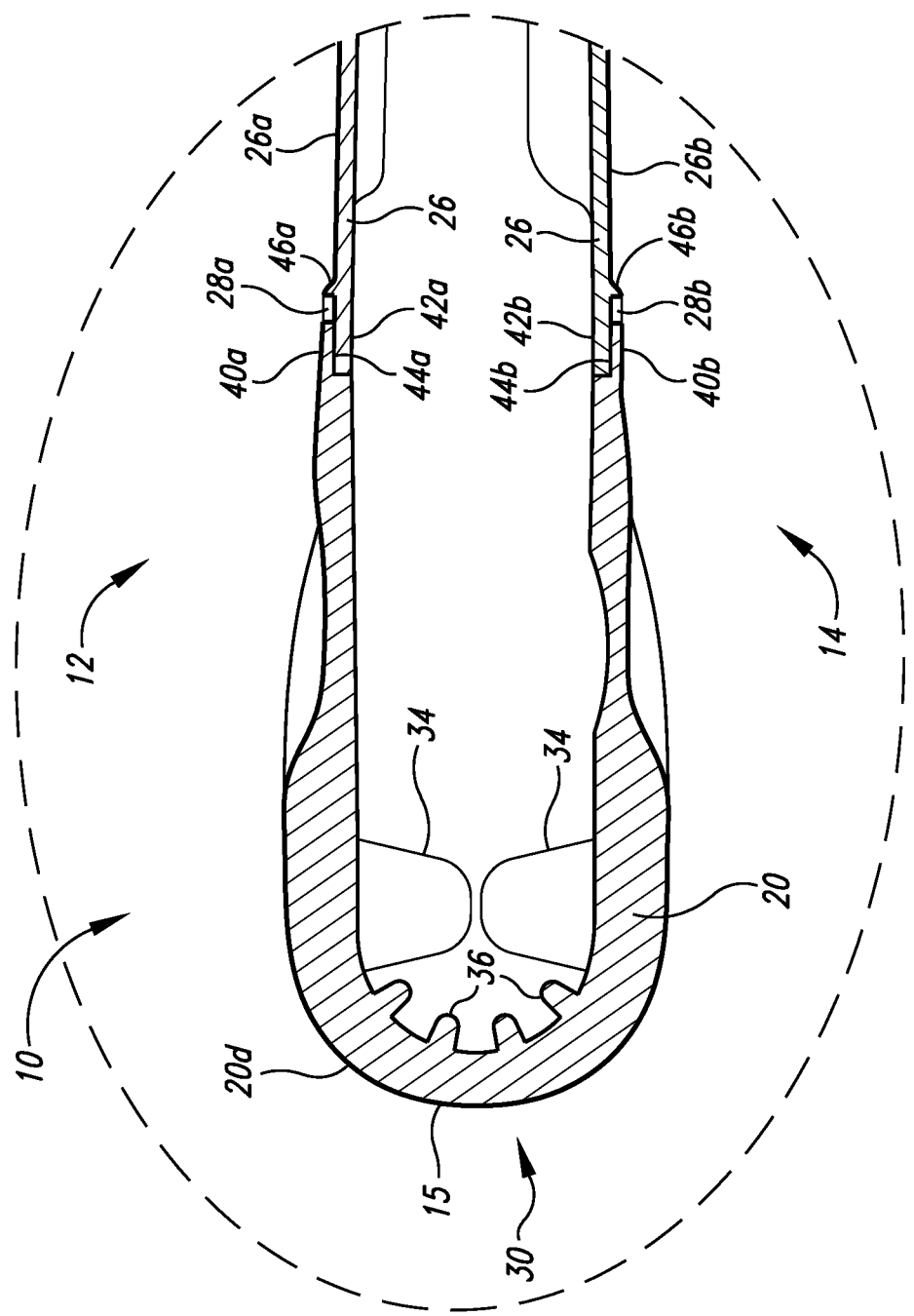
FIG. 8A is an enlarged cross-sectional side-elevational view of a dashed-oval-designated "8A" portion of portable device case of FIG. 6, which is a cross-sectional side-elevational view along 6-6 cut line of FIG. 4 and FIG. 5 showing inner space bounded by interior portions of portable device case in closed disposition.

Referring now to FIG. 8A, portable electronic device case 10 is shown in an enlarged cross-sectional side-elevational view of a dashed-oval-designated "8A" portion of portable device case of FIG. 6 in closed disposition. Shown is first overmold portion 40a of fourth portion 20d of semiflexible plastic piece 20 that overlaps first overmold portion 42a of first semirigid plastic panel 26a of semirigid plastic material 26 at first interface 44a. First channel 28a is formed by first ridge 46a of first semirigid plastic panel 26a, by a portion of first overmold portion 40a, and by a portion of first overmold portion 42a. Also shown is second overmold portion 40b of fourth portion 20d of semiflexible plastic piece 20 that overlaps second overmold portion 42b of second semirigid plastic panel 26b of semirigid plastic material 26 at second interface 44b. Second channel 28b is formed by second ridge 46b of second semirigid plastic panel 26b, by a portion of second overmold portion 40b, and by a portion of second overmold portion 42b.

Turning to FIGS. 8B and 9, further views of portable electronic device case 10 are shown involving first and second overmold portions 40a and 40b, first and second overmold portions 42a and 42b, overlapping each other at first and second interfaces 44a and 44b, respectively. FIG. 8B is an enlarged cross-sectional side-elevational view of a dashed-circle-designated "8B" portion of portable device case of FIG. 6, which is a cross-sectional side-elevational view along 6-6 cut line of FIG. 4 and FIG. 5 showing inner space bounded by interior portions of portable device case in closed disposition. FIG. 9 is an enlarged cross-sectional side-elevational view of a dashed-circle-designated "9" portion of portable device case of FIG. 7, which is a cross-sectional side-elevational view along 7-7 cut line of FIG. 4 and FIG. 5 showing inner space bounded by interior portions of portable device case while in its closed disposition.

Further aspects of portable electronic device case 10 include following: second primary material 26 when translucent or transparent allows to be seen through to provide clear access to allow scanning for asset tags without need for opening up portable electronic device case 10. Semiflexible plastic piece 20 can have a hardness range of between 55-85 degrees. During molding, after the first semirigid plastic panel 26a and the second semirigid plastic panel 26b are formed, the semiflexible plastic piece 20 can be formed to overlap the first semirigid plastic panel 26a and the second semirigid plastic panel 26b to be "over-molded" or "co-molded" with the first semirigid plastic panel 26a and the second semirigid plastic panel 26b. More material is shown to be located at corners of portable electronic device case for impact protection in case of accidentally drops.

For instance, steps of a manufacture process can include 1) tool/create metal mold (e.g. steel mold), 2) heat semirigid plastic material 26 (e.g. polycarbonate) to be a fluid to fill a first portion of the metal mold, 3) wait for semirigid plastic material 26 plastic to solidify to form the first semirigid plastic panel 26a and the second semirigid plastic panel 26b of the portable electronic device case 10, 4) heat semiflexible plastic material (e.g. thermoplastic elastomers (TPE), thermoplastic polyurethane, or silicone) to be a fluid to fill a second portion of the metal mold, 5) wait for the semiflexible plastic material 26 to solidify to form the semiflexible plastic piece 20 to partially overlap and to be molded with the first semirigid plastic panel 26a and the second semirigid plastic panel 26b of the portable electronic device case 10 so that the softer semiflexible plastic piece 20 forms around edges of the first semirigid plastic panel 26a and the second semirigid plastic panel 26b for shock absorptive protection as well as forming spine portion 15 that transitions from device display receiving portion 12 to device keyboard receiving portion 14. Consequently, the semiflexible plastic piece 20 is molded together with the first and second semirigid plastic panels 26a, 26b to partially overlap with them and to form first and second channels 28a, 28b therebetween and overall to form the single-molded dual-material portable electronic device case 10.

Figure 10:
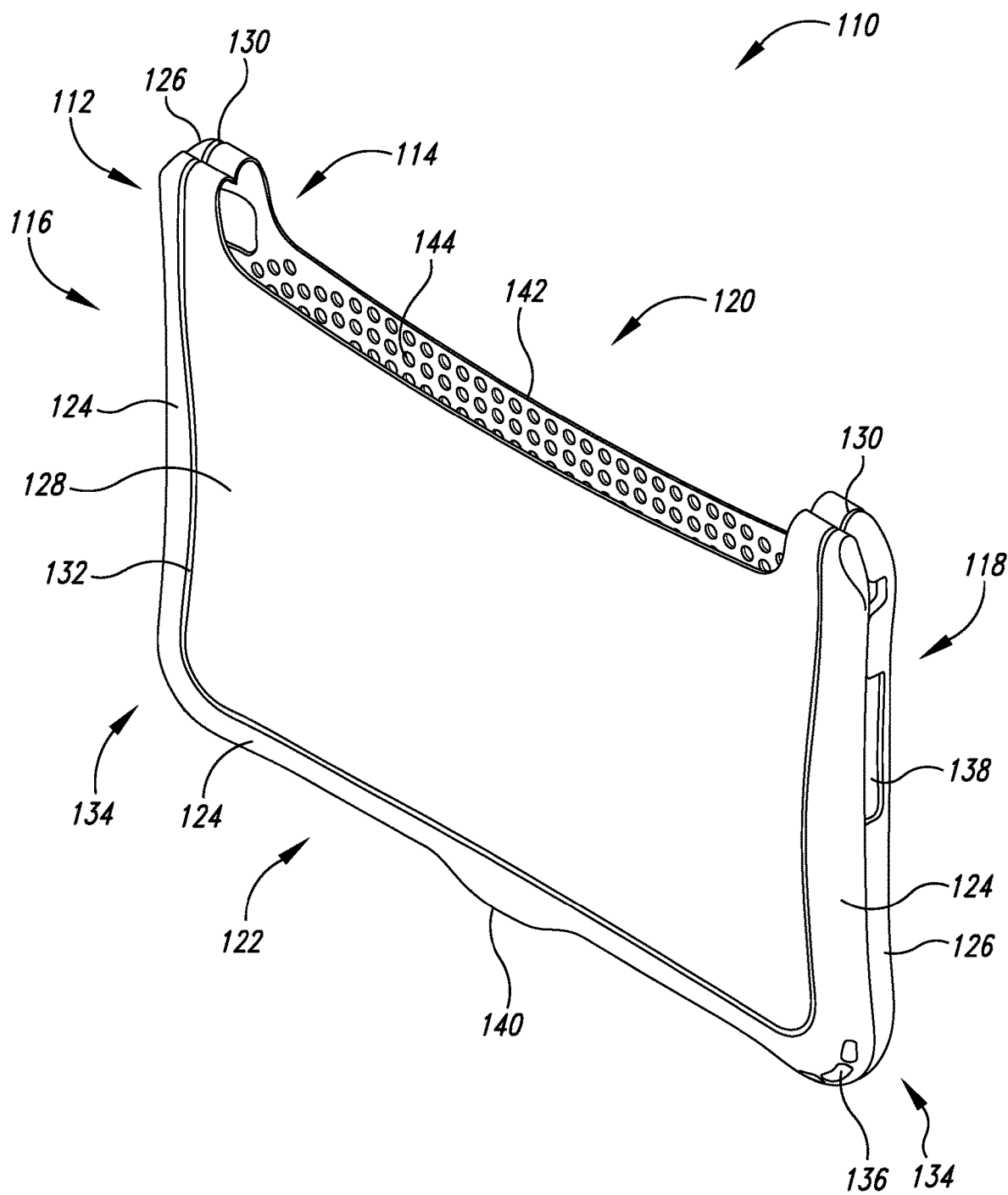
FIG. 10 is a first exterior perspective view of a second embodiment of portable electronic device case.

Turning to FIG. 10, shown is a first exterior perspective view of a second embodiment of portable device case 110 to include first case section 112, which is to house a display portion of an electronic device and second case section 114, which is to house a keyboard portion of an electronic device. First case section 112 and second case section 114 can be attached to an electronic device separately as two pieces to the electronic device's keyboard and display sections to rotate 360 degrees to go into tablet mode if the electronic device is capable of such rotation. Portable electronic device case 110 further includes first side 116, second side 118, first end 120, and second end 122. Portable electronic device case 110 also includes first section—semiflexible plastic piece 124 and second section—semiflexible plastic piece 126, which both can be made out of the same material as semiflexible plastic piece 20 and same manufacturing methods of portable electronic device case 10. Portable electronic device case 110 also includes first section—semirigid plastic material 128 and second section—semirigid plastic material 142, which both can be made out of the same material as semirigid plastic material 26 and same manufacturing methods of portable electronic device case 10. First channel 132 is positioned between first section—semiflexible plastic piece 124 and first section—semirigid plastic material 128. Second channel 130 is positioned between second section—semiflexible plastic piece 126 and second section—semirigid plastic material 142. Also shown are corners 134 having cutouts 136 in first section—semiflexible plastic piece 124 to provide crumple-like shock absorptive qualities as discussed above regarding portable electronic device case 10. First section—semiflexible plastic piece 124 also is shown with tab 140. Second section—semiflexible plastic piece 126 is also shown with port hole 138 to provide cable or other access to a portable electronic device contained by portable electronic device case 110. Plurality of regularly spaced apertures 144 in second section—semirigid plastic material 142 are fashioned to provide convective ventilation for a portable electronic device contained by portable electronic device case 110.

Figure 11:
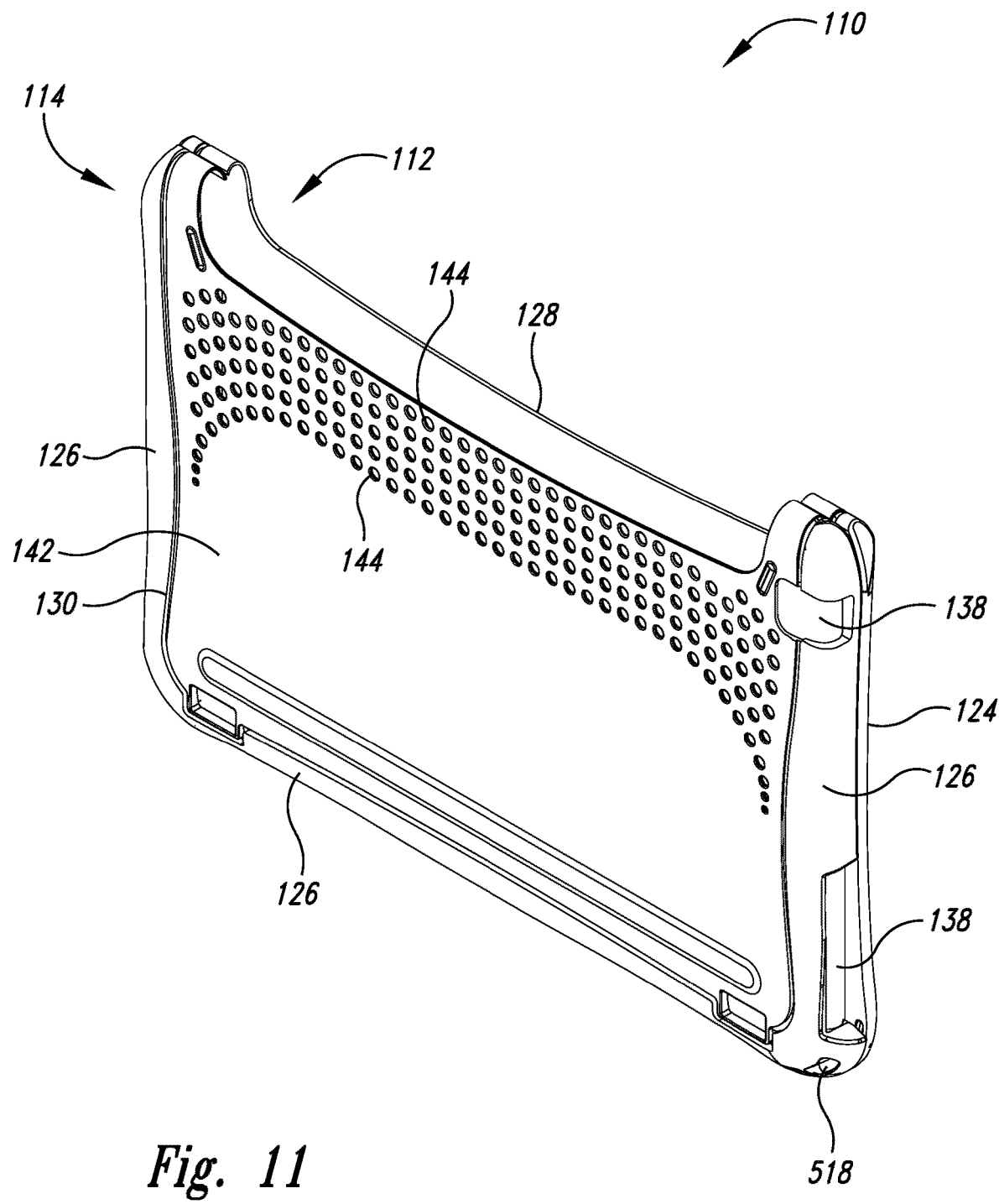
FIG. 11 is a second exterior perspective view of the portable electronic device case of FIG. 10.
Figure 12:
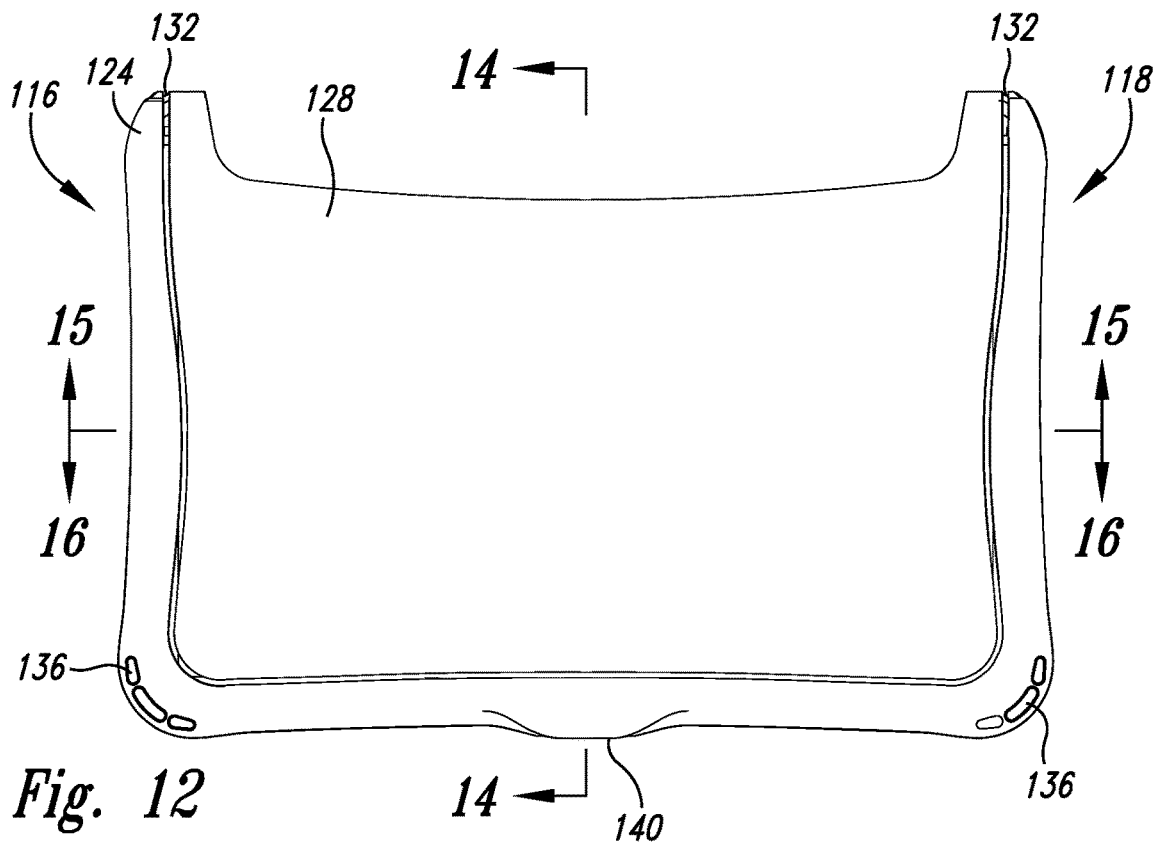
FIG. 12 is a first top plan view of the portable electronic device case of FIG. 10.
Figure 13:
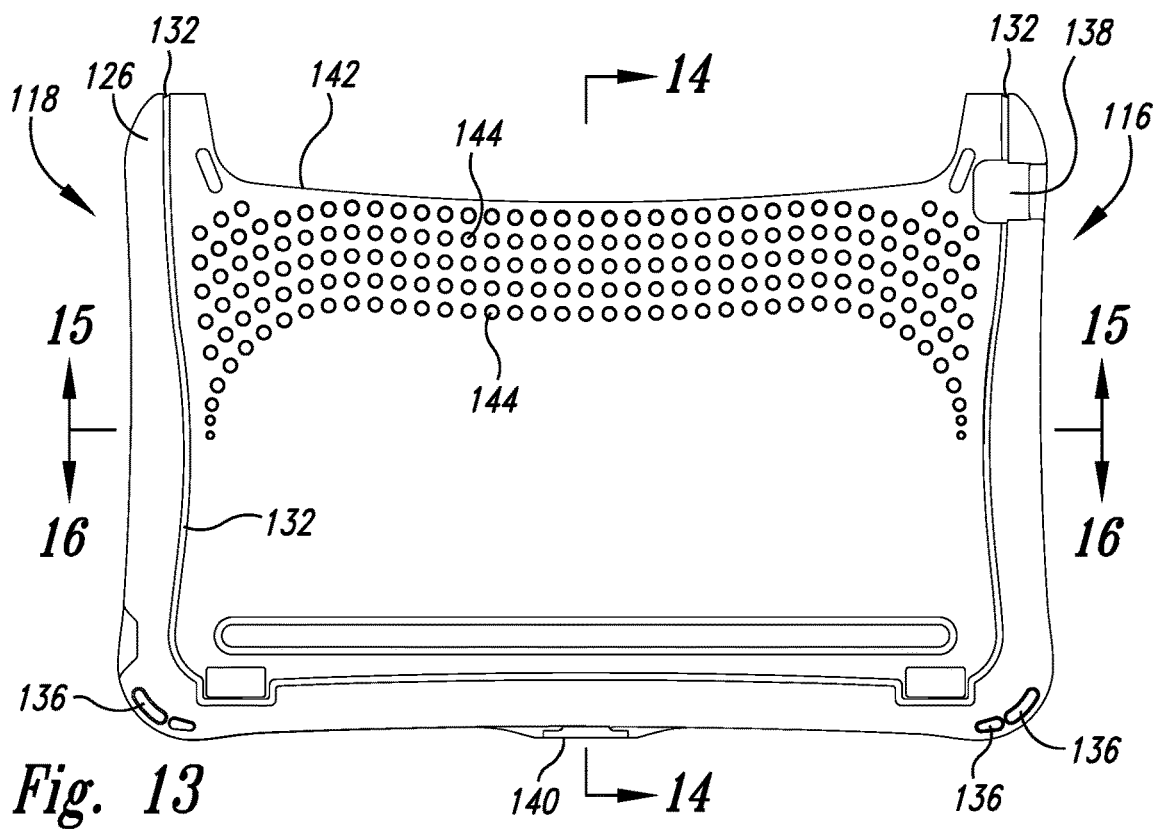
FIG. 13 is a second top plan view of the portable electronic device case of FIG. 10.

Referring now to FIG. 11, portable electronic device case 110 is shown in second exterior perspective view better showing second case section 114 of the portable device case of FIG. 10. Turning to FIG. 12, portable electronic device case 110 is shown in first top plan view showing first case section 112. Turning to FIG. 13, portable electronic device case 110 is shown in second top plan view showing second case section 112.

Turning to FIG. 14, portable electronic device case 110 is shown in cross-sectional side-elevational view along 14-14 cut line of FIG. 12 and FIG. 13 showing inner space bounded by interior portions of portable device case while in its closed disposition. Referring now to FIG. 15 portable electronic device case 110 is shown in cross-sectional side-elevational view along 15-15 cut line of FIG. 12 and FIG. 13 showing inner space bounded by interior portions of portable device case while in its closed disposition. Turning to FIG. 16, portable electronic device case 110 is shown in cross-sectional side-elevational view along 16-16 cut line of FIG. 12 and FIG. 13 showing inner space bounded by interior portions of portable device case while in its closed disposition.

Figures 17, 18:
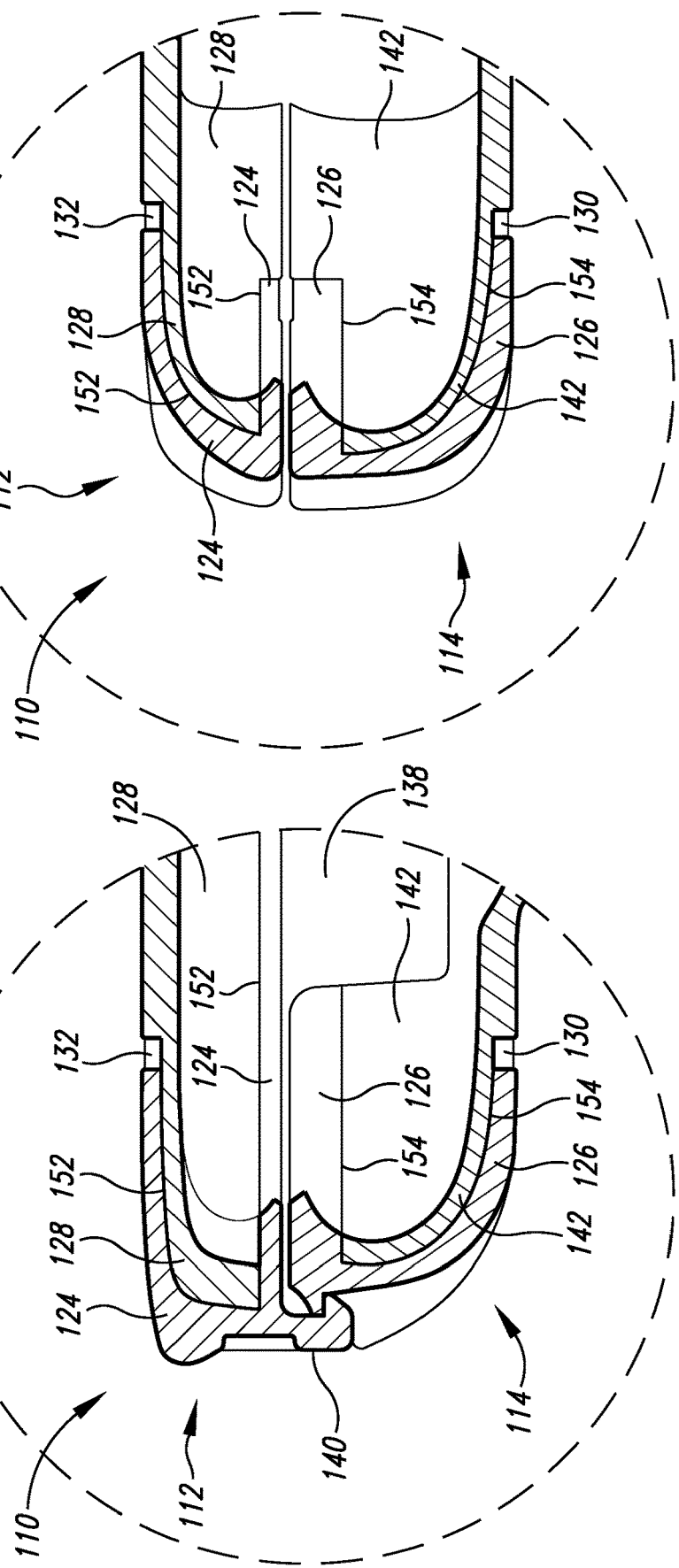
FIG. 17 is an enlarged cross-sectional side-elevational view of a dashed-circle-designated "17" portion of portable device case of FIG. 14, which is a cross-sectional side-elevational view along 14-14 cut line of FIG. 12 and FIG. 13 showing inner space bounded by interior portions of portable electronic device case while in its closed disposition.
FIG. 18 is an enlarged cross-sectional side-elevational view of a dashed-circle-designated "18" portion of portable device case of FIG. 15, which is a cross-sectional side-elevational view along 15-15 cut line of FIG. 12 and FIG. 13 showing inner space bounded by interior portions of portable electronic device case while in its closed disposition.

Referring now to FIG. 17, portable electronic device case 110 is shown in enlarged cross-sectional side-elevational view of a dashed-circle-designated "17" portion of portable device case of FIG. 14, which is a cross-sectional side-elevational view along 14-14 cut line of FIG. 12 and FIG. 13 showing inner space bounded by interior portions of portable device case while in its closed disposition. Turning to FIG. 18, portable electronic device case 110 is shown in enlarged cross-sectional side-elevational view of a dashed-circle-designated "18" portion of portable device case of FIG. 15, which is a cross-sectional side-elevational view along 15-15 cut line of FIG. 12 and FIG. 13 showing inner space bounded by interior portions of portable device case while in its closed disposition. Referring now to FIG. 19, portable electronic device case 110 is shown in enlarged cross-sectional side-elevational view of a dashed-circle-designated "19" portion of portable device case of FIG. 16, which is a cross-sectional side-elevational view along 16-16 cut line of FIG. 12 and FIG. 13 showing inner space bounded by interior portions of portable device case while in its closed disposition. FIGS. 17-19 better show detail regarding overlap of first section—semiflexible plastic piece 124 and first section—semirigid plastic material 128 at first interface 152 and overlap of second section—semiflexible plastic piece 126 and second section—semirigid plastic material 142 at second interface 154, first channel 132 formed by portions of first section—semiflexible plastic piece 124 and first section—semirigid plastic material 128, and second channel 130 formed by portions of second section—semiflexible plastic piece 126 and second section—semirigid plastic material 142.

Figure 20:
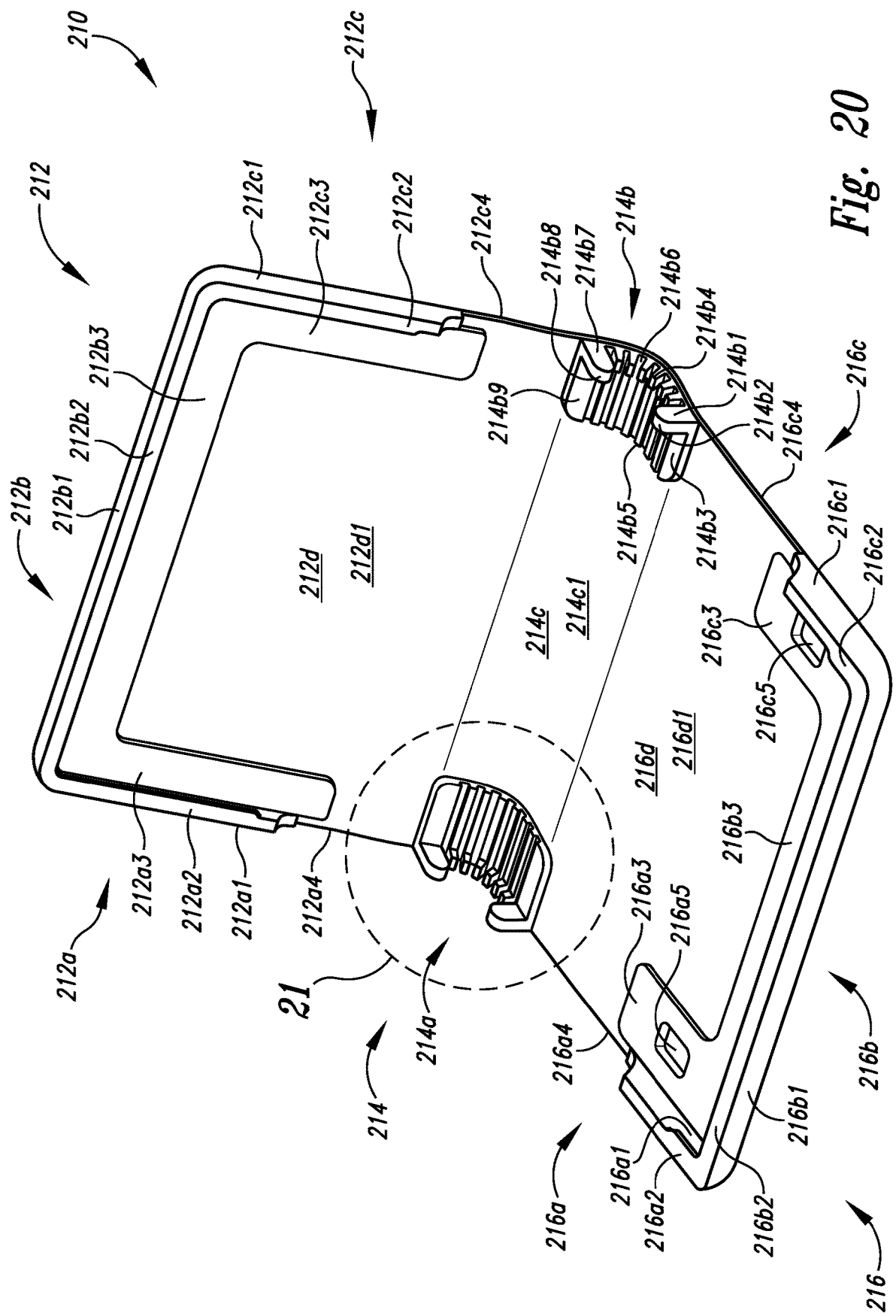
FIG. 20 is a perspective view of a third embodiment of portable electronic device case.

Turning to FIG. 20, depicted therein is a front perspective view of a third embodiment of portable electronic device case 210. The third embodiment of portable electronic device case 210 is shown to include device display receiving portion 212, spine portion 214, and device keyboard receiving portion 216. The device display receiving portion 212, is shown to include first side 212$a$, second side 212$b$, third side 212$c$, and single layer 212$d$. The first side 212$a$ is shown to include first wall portion 212$a$1, first ledge portion 212$a$2, first backing portion 212$a$3, and first edge 212$a$4. The second side 212$b$ is shown to include second wall portion 212$b$1, second ledge portion 212$b$2, and second backing portion 212$b$3. The third side 212$c$ is shown to include third wall portion 212$c$1, third ledge portion 212$c$2, third backing portion 212$c$3, and third edge 212$c$4. The single layer 212$d$ is shown to include interior surface single material layer 212$d$1. The spine portion 214 is shown to include first corrugated hinge pad 214$a$, second corrugated hinge pad 214$b$, and single layer 214$c$. The second corrugated hinge pad 214$b$ is shown to include stop 214$b$1, stop tip 214$b$2, stop base 214$b$3, rib tip 214$b$4, rib 214$b$5, groove 214$b$6, stop 214$b$7, stop tip 214$b$8, and stop base 214$b$9. The single layer 214$c$ is shown to include interior surface single material layer 214$c$1. The device keyboard receiving portion 216 is shown to include first side 216$a$, second side 216$b$, third side 216$c$, and single material layer 216$d$. The first side 216$a$ is shown to include first wall portion 216$a$1, first ledge portion 216$a$2, first backing portion 216$a$3, first edge 216$a$4, and first backing portion aperture 216$a$5. The second side 216$b$ is shown to include second wall portion 216$b$1, second ledge portion 216$b$2, and second backing portion 216$b$3. The third side 216$c$ is shown to include third wall portion 216$c$1, third ledge portion 216$c$2, third backing portion 216$c$3, third edge 216$c$4, and third backing portion aperture 216$c$5. The single material layer 216$d$ is shown to include interior surface single material layer 216$d$1.

Figure 21:
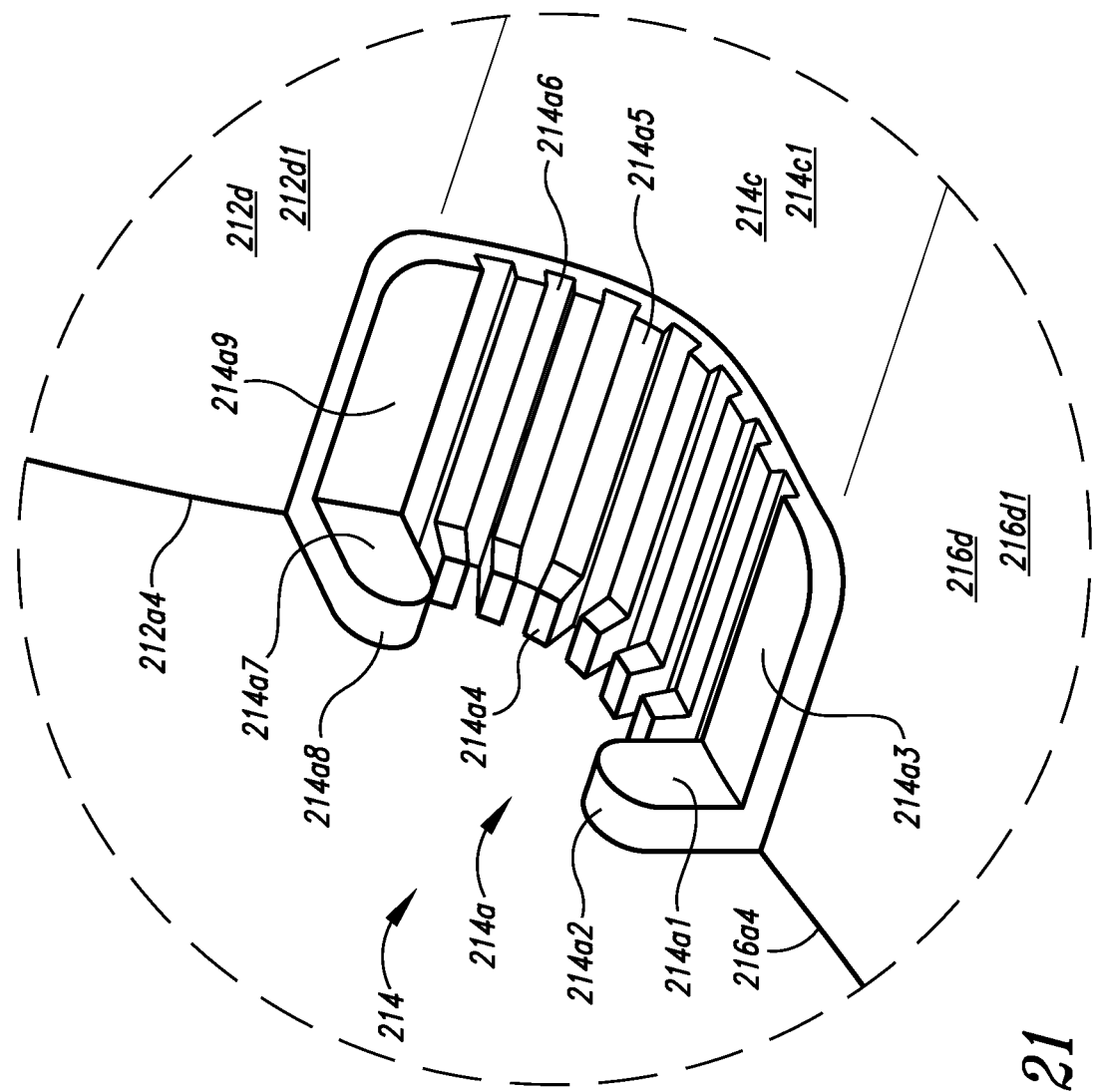
FIG. 21 is an enlarged perspective view of a portion of the third embodiment of portable electronic device case from within the "22"-circle of FIG. 20.

Turning to FIG. 21, depicted therein is an enlarged front perspective view of a portion of the third embodiment of portable electronic device case 210 from within the "22"-circle of FIG. 20. The first corrugated hinge pad 214$a$ is shown to include stop 214$a$1, stop tip 214$a$2, stop base 214$a$3, rib tip 214$a$4, rib 214$a$5, groove 214$a$6, stop 214$a$7, stop tip 214$a$8, and stop base 214$a$9.

Figure 22:
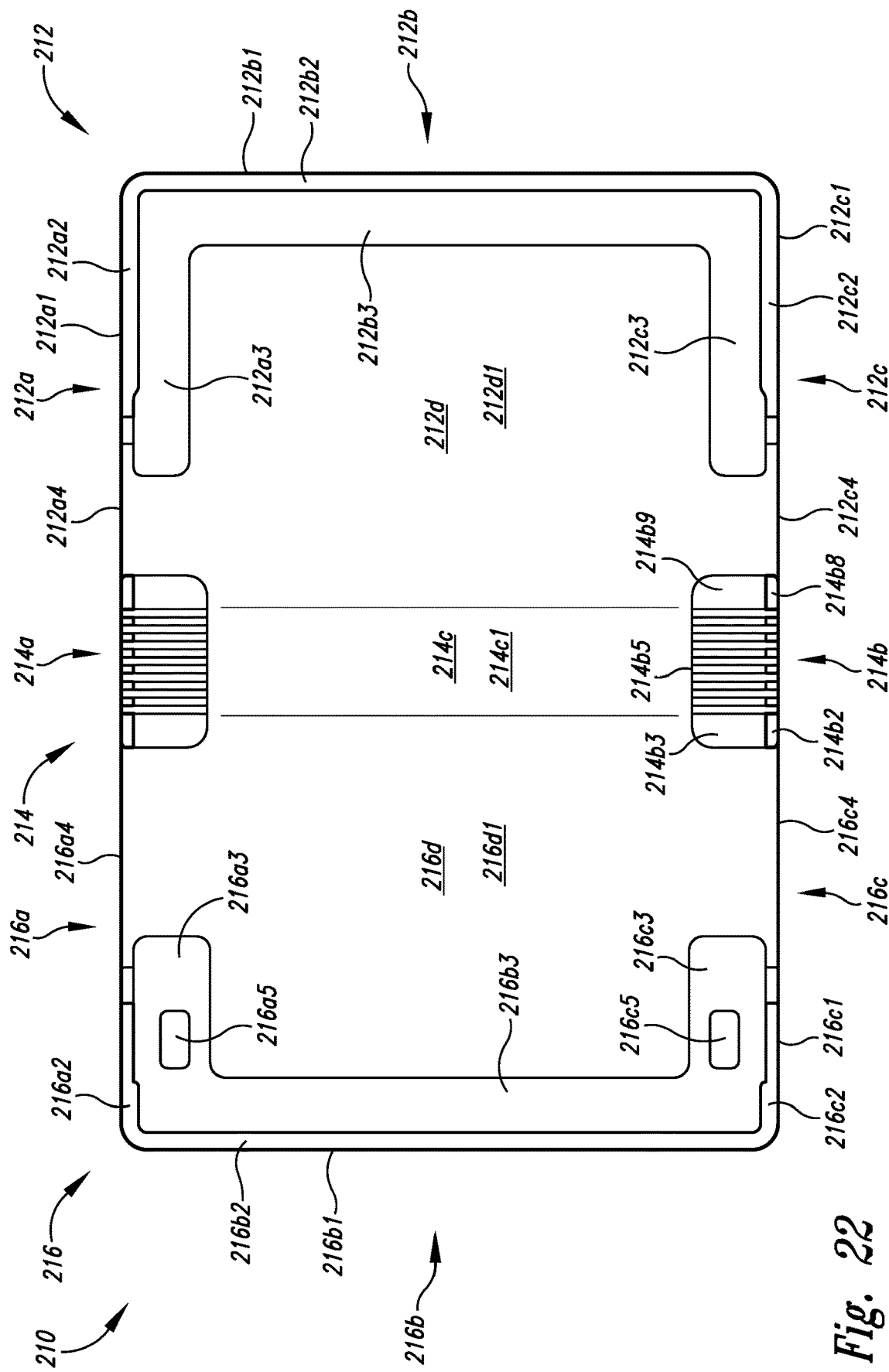
FIG. 22 is a top plan view of the third embodiment of portable electronic device case of FIG. 20.

Turning to FIG. 22, depicted therein is a top plan view of the third embodiment of portable electronic device case 210 of FIG. 20.

Figure 23:
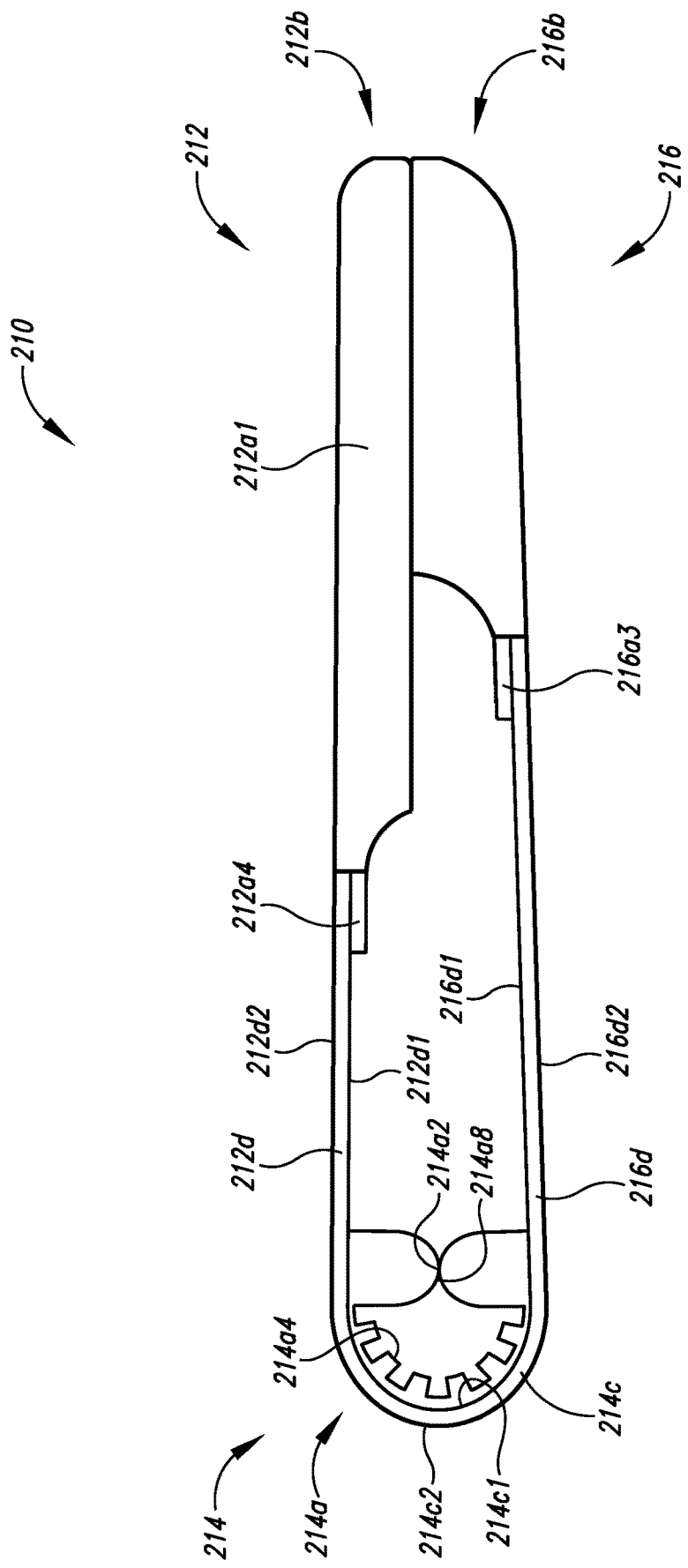
FIG. 23 is a side elevational view of a single layer version of the third embodiment of portable electronic device case of FIG. 20.

Turning to FIG. 23, depicted therein is a side elevational view of a single layer version of the third embodiment of portable electronic device case 210 of FIG. 20. The single layer 212$d$ is shown to further include exterior surface single material layer 212$d$2. The single layer 214$c$ is shown to further include exterior surface single material layer 214$c$2.

Figure 24:
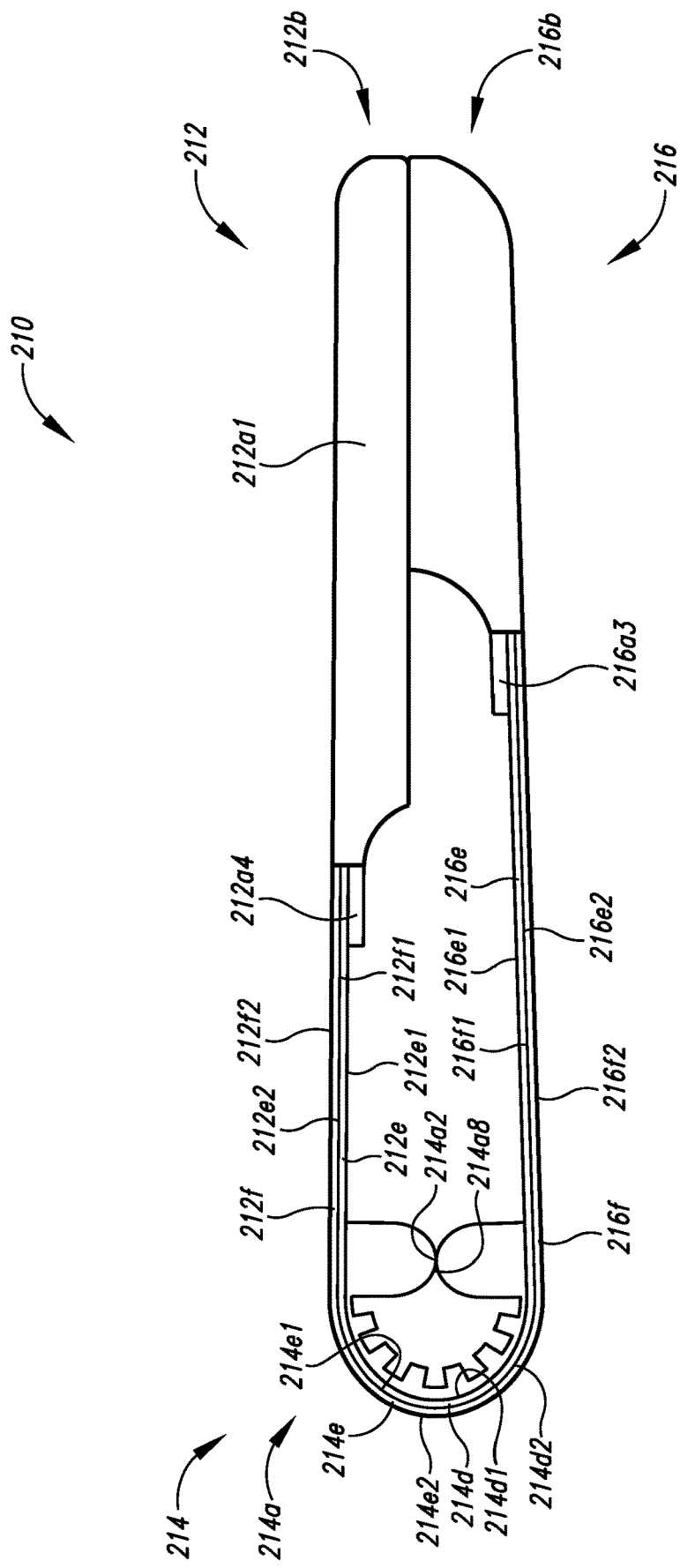
FIG. 24 is a side elevational view of a multiple layer version of the third embodiment of portable electronic device case of FIG. 20.

Turning to FIG. 24, depicted therein is a side elevational view of a multiple layer version of the third embodiment of portable electronic device case 210 of FIG. 20. The device display receiving portion 212 is shown to include inner material layer 212$e$, and outer material layer 212$f$. The inner material layer 212$e$ is shown to include interior surface inner material layer 212$e$1 and exterior surface inner material layer 212$e$2. The outer material layer 212$f$ is shown to include interior surface outer material layer 212$f$1 and exterior surface outer material layer 212$f$2. The spine portion 214 is shown to include inner layer 214$d$, and outer layer 214$e$. The inner layer 214$d$ is shown to include interior surface inner material layer 214$d$1 and exterior surface inner material layer 214$d$2. The outer layer 214$e$ is shown to include interior surface outer material layer 214$e$1 and exterior surface outer material layer 214$e$2. The device keyboard receiving portion 216 is shown to include inner material layer 216$e$, and outer material layer 216$f$. The inner material layer 216$e$ is shown to include interior surface inner material layer 216$e$1 and exterior surface inner material layer 216$e$2. The outer material layer 216$f$ is shown to include interior surface outer material layer 216$f$1 and exterior surface outer material layer 216$f$2.

As shown in FIGS. 20-24, implementations of third embodiment of portable electronic device case 210 can be for coupling with a portable electronic device, the portable electronic device can include a device display and a device keyboard, the display portion and the keyboard portion of the portable electronic device can be hingedly disposed therebetween. The third embodiment of portable electronic device case 210 can include device display receiving portion 212, device keyboard receiving portion 216, and spine portion 214 extending therebetween. The spine portion 214 can have a flexibility sufficient to accommodate hinged disposition between the device display receiving portion 212, and the device keyboard receiving portion 216, the spine portion 214 including at least one plurality of ribs (e.g. rib 214$b$5) and at least one pair of stops including a first stop (e.g. stop 214$a$1) and a second stop (e.g. stop 214$a$7). The first stop (e.g. stop 214$a$1) and the second stop (e.g. stop 214$a$7) of the at least one pair of stops can be larger in size than the at least one plurality of ribs (e.g. rib 214$b$5). The first stop (e.g. stop 214$a$1) and the second stop (e.g. stop 214$a$7) of the at least one pair of stops can be positioned to be oppositely facing when the third embodiment of portable electronic device case 210 is in closed disposition to allow for contact between the first stop (e.g. stop 214$a$1) and the second stop (e.g. stop 214$a$7) of the at least one pair of stops to maintain spacing between one or more portions of the device display receiving portion 212 and one or more portions of the device keyboard receiving portion 216.

In implementations, the spine portion 214 can include but is not limited to at least the first corrugated hinge pad 214$a$ including the at least one pair of stops, the at least one plurality of ribs (e.g. rib 214$b$5), at least one plurality of grooves (e.g. including the groove 214$a$6), and at least one stop base (e.g. including the stop base 214$a$9).

In implementations, the first stop (e.g. stop 214$a$1) of the at least one pair of stops can include a first stop tip (e.g. stop tip 214$a$2) and the second stop (e.g. stop 214$a$7) of the at least one pair of stops includes a second stop tip (e.g. stop tip 214$a$8) the first stop tip and the second stop tip can be positioned to contact one another when the first stop (e.g.

stop 214*a*1) and the second stop (e.g. stop 214*a*7) of the at least one pair of stops contact one another.

In implementations, the spine portion 214 can include the single material layer 214*c* having a flexibility, the flexibility of the spine portion 214 based at least in part on the flexibility of the single material layer 214*c*.

In implementations, the single material layer 214*c* can comprise a material selected from a fabric material, a rubberized material, or a plastic material.

In implementations, the spine portion 214 can include the inner material layer 214*d* having a first flexibility and the outer material layer 214*e* having a second flexibility, the flexibility of the spine portion 214 based at least in part on the first flexibility of the inner material layer 214*d* and the second flexibility of the outer material layer 214*e*.

In implementations, the inner material layer 214*d* includes but is not limited to a fabric material and the outer material layer 214*e* includes but is not limited to a rubberized material.

In implementations, the device display receiving portion 212 can include but the inner material layer 214*d* and the outer material layer 214*e*.

In implementations, the inner material layer 214*d* can include a fabric material and the outer material layer 214*e* can include a rubberized material.

In implementations, the device keyboard receiving portion 216 can include the inner material layer 214*d* and the outer material layer 214*e*.

In implementations, the inner material layer 214*d* includes but is not limited to a fabric material and the outer material layer 214*e* includes but is not limited to a rubberized material.

In implementations, the spine portion 214, the device display receiving portion 212, and the device keyboard receiving portion 216 share at least a single material layer.

In implementations, the spine portion 214, the device display receiving portion 212, and the device keyboard receiving portion 216 share the inner material layer 214*d* and the outer material layer 214*e*.

Implementations can include an inner material layer of a continuous fabric material layer and an outer material layer of a continuous rubberized material layer. The spine portion 214 can include a first portion of the inner material layer of the continuous fabric material layer. The device display receiving portion 212 can include a second portion of the inner material layer of the continuous fabric material layer, and the device keyboard receiving portion 216 can include a third portion of the inner material layer of the continuous fabric material layer. The spine portion 214 can include a first portion of the outer material layer of the continuous rubberized material layer. The device display receiving portion 212 can include a second portion of the outer material layer of the continuous rubberized material layer, and the device keyboard receiving portion 216 includes but is not limited to at least a third portion of the outer material layer of the continuous rubberized material layer.

In implementations, the spine portion 214, the device display receiving portion 212, and the device keyboard receiving portion 216 share the inner material layer 214*d* and the outer material layer 214*e*.

In implementations, third embodiment of portable electronic device case 210 can be for coupling with a portable electronic device, the portable electronic device can include a device display. The third embodiment of portable electronic device case 210 can include the device display receiving portion 212, and the spine portion 214 can extend therefrom. The spine portion 214 can include at least one plurality of ribs (e.g. rib 214*b*5) and at least one pair of stops including a first stop (e.g. stop 214*a*1) and a second stop (e.g. stop 214*a*7). The spine portion 214 can have flexibility sufficient to accommodate a closed disposition for the third embodiment of portable electronic device case 210 and to accommodate an open disposition for the third embodiment of portable electronic device case 210. The first stop (e.g. stop 214*a*1) and the second stop (e.g. stop 214*a*7) of the at least one pair of stops can be larger in size than the at least one plurality of ribs (e.g. rib 214*b*5). The first stop (e.g. stop 214*a*1) and the second stop (e.g. stop 214*a*7) of the at least one pair of stops can be positioned to be spaced from one another when the third embodiment of portable electronic device case 210 is in the open disposition. The first stop (e.g. stop 214*a*1) and the second stop (e.g. stop 214*a*7) of the at least one pair of stops can be positioned to be oppositely facing when the third embodiment of portable electronic device case 210 is in the closed disposition to allow for contact between the first stop (e.g. stop 214*a*1) and the second stop (e.g. stop 214*a*7) of the at least one pair of stops to maintain spacing between one or more first portions of the spine portion 214 and one or more second portions of the spine portion 214.

In implementations, the inner material layer 214*d* of the spine portion 214, and the inner material layer 212*e* of the device display receiving portion 212, can share a continuous fabric material layer. The outer material layer 214*e* of the spine portion 214 and the outer material layer 212*f* of the device display receiving portion 212 can share a continuous rubberized material layer.

In implementations, the spine portion 214 can include the inner material layer 214*d* of a fabric material and the outer material layer 214*e* of a rubberized material.

In implementations, the third embodiment of portable electronic device case 210 can be for coupling with a portable electronic device, the portable electronic device including a device keyboard. The third embodiment of portable electronic device case 210 can include the device keyboard receiving portion 216, and the spine portion 214 extending therefrom. The spine portion 214 include at least one plurality of ribs (e.g. rib 214*b*5) and at least one pair of stops including a first stop (e.g. stop 214*a*1) and a second stop (e.g. stop 214*a*7) The spine portion 214 can have flexibility sufficient to accommodate a closed disposition for the portable electronic device and to accommodate an open disposition for the third embodiment of portable electronic device case 210. The first stop (e.g. stop 214*a*1) and the second stop (e.g. stop 214*a*7) of the at least one pair of stops can be larger in size than the at least one plurality of ribs (e.g. rib 214*b*5). The first stop (e.g. stop 214*a*1) and the second stop (e.g. stop 214*a*7) of the at least one pair of stops can be positioned to be spaced from one another when the third embodiment of portable electronic device case 210 is in the open disposition. The first stop (e.g. stop 214*a*1) and the second stop (e.g. stop 214*a*7) of the at least one pair of stops being positioned to be oppositely facing when the third embodiment of portable electronic device case 210 is in the closed disposition to allow for contact between the first stop (e.g. stop 214*a*1) and the second stop (e.g. stop 214*a*7) of the at least one pair of stops to maintain spacing between one or more first portions of the spine portion 214 and one or more second portions of the spine portion 214.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device case for coupling with a portable electronic device, the portable electronic device including a device display and a device keyboard, the display portion and the keyboard portion of the portable electronic device hingedly disposed therebetween, the portable electronic device case comprising:
   a device display receiving portion, a device keyboard receiving portion, and a spine portion extending therebetween, the spine portion having a flexibility sufficient to accommodate hinged disposition between the device display receiving portion, and the device keyboard receiving portion, the spine portion including at least one plurality of ribs and at least one pair of stops including a first stop and a second stop, the first stop and the second stop of the at least one pair of stops being larger in size than the at least one plurality of ribs, the first stop and the second stop of the at least one pair of stops being positioned to be oppositely facing when the portable electronic device case is in a closed disposition to allow for contact between the first stop and the second stop of the at least one pair of stops to maintain spacing between one or more portions of the device display receiving portion and one or more portions of the device keyboard receiving portion.

2. The portable electronic device case of claim 1, wherein the spine portion includes but is not limited to at least one corrugated hinge pad including the at least one pair of stops, the at least one plurality of ribs, at least one plurality of grooves, and at least one stop base.

3. The portable electronic device case of claim 2, wherein the first stop of the at least one pair of stops includes a first stop tip and the second stop of the at least one pair of stops includes a second stop tip the first stop tip and the second stop tip being positioned to contact one another when the first stop and the second stop of the at least one pair of stops contact one another.

4. The portable electronic device case of claim 1, wherein the spine portion includes but is not limited to a single material layer having a flexibility, the flexibility of the spine portion based at least in part on the flexibility of the single material layer.

5. The portable electronic device case of claim 4, wherein the single material layer comprises a material selected from a fabric material, a rubberized material, or a plastic material.

6. The portable electronic device case of claim 1, wherein the spine portion includes but is not limited to an inner material layer having a first flexibility and an outer material layer having a second flexbility, the flexibility of the spine portion based at least in part on the first flexibility of the inner material layer and the second flexbility of the outer material layer.

7. The portable electronic device case of claim 6, wherein the inner material layer includes but is not limited to a fabric material and the outer material layer includes but is not limited to a rubberized material.

8. The portable electronic device case of claim 1, wherein the device display receiving portion includes but is not limited to a inner material layer and an outer material layer.

9. The portable electronic device case of claim 8, wherein the inner material layer includes but is not limited to a fabric material and the outer material layer includes but is not limited to a rubberized material.

10. The portable electronic device case of claim 1, wherein the device keyboard receiving portion includes but is not limited to a inner material layer and an outer material layer.

11. The portable electronic device case of claim 10, wherein the inner material layer includes but is not limited to a fabric material and the outer material layer includes but is not limited to a rubberized material.

12. The portable electronic device case of claim 1, wherein the spine portion, the device display receiving portion, and the device keyboard receiving portion share at least a continuous single material layer.

13. The portable electronic device case of claim 1, wherein the spine portion, the device display receiving portion, and the device keyboard receiving portion share an inner material layer and an outer material layer.

14. The portable electronic device case of claim 13, wherein the inner material layer includes but is not limited to a fabric material and the outer material layer includes but is not limited to a rubberized material.

15. The portable electronic device case of claim 1, further comprising an inner material layer of a continuous fabric material layer and an outer material layer of a continous rubberized material layer wherein the spine portion includes but is not limited to at least a first portion of the inner material layer of the continuous fabric material layer, the device display receiving portion includes but is not limited to at least a second portion of the inner material layer of the continuous fabric material layer, and the device keyboard receiving portion includes but is not limited to at least a third portion of the inner material layer of the continuous fabric material layer and wherein the spine portion includes but is not limited to at least a first portion of the outer material layer of the continuous rubberized material layer, the device display receiving portion includes but is not limited to at least a second portion of the outer material layer of the continuous rubberized material layer, and the device display receiving portion includes but is not limited to at least a third portion of the outer material layer of the continuous rubberized material layer.

16. A portable electronic device case for coupling with a portable electronic device, the portable electronic device including a device display, the portable electronic device case comprising:
a device display receiving portion, and a spine portion extending therefrom, the spine portion including at least one plurality of ribs and at least one pair of stops including a first stop and a second stop, the spine portion having flexibility sufficient to accommodate a closed disposition for the portable electronic device case and to accommodate an open disposition for the portable electronic device case, the first stop and the second stop of the at least one pair of stops being larger in size than the at least one plurality of ribs, the first stop and the second stop of the at least one pair of stops being positioned to be spaced from one another when the portable electronic device case is in the open disposition, the first stop and the second stop of the at least one pair of stops being positioned to be oppositely facing when the portable electronic device case is in the closed disposition to allow for contact between the first stop and the second stop of the at least one pair of stops to maintain spacing between one or more first portions of the spine portion and one or more second portions of the spine portion.

17. The portable electronic device case of claim 16, further comprising an inner material layer of a continuous fabric material layer and an outer material layer of a continuous rubberized material layer wherein the spine portion includes but is not limited to at least a first portion of the inner material layer of the continuous fabric material layer and the device display receiving portion includes but is not limited to at least a second portion of the inner material layer of the continuous fabric material layer and wherein the spine portion includes but is not limited to at least a first portion of the outer material layer of the continuous rubberized material layer and the device display receiving portion includes but is not limited to at least a second portion of the outer material layer of the continuous rubberized material layer.

18. The portable electronic device case of claim 16, wherein the spine portion includes but is not limited to at least an inner material layer of a fabric material and at least an outer material layer of a rubberized material.

19. A portable electronic device case for coupling with a portable electronic device, the portable electronic device including a device keyboard, the portable electronic device case comprising:
a device keyboard receiving portion, and a spine portion extending therefrom, the spine portion including at least one plurality of ribs and at least one pair of stops including a first stop and a second stop, the spine portion having flexibility sufficient to accommodate a closed disposition for the portable electronic device case and to accommodate an open disposition for the portable electronic device case, the first stop and the second stop of the at least one pair of stops being larger in size than the at least one plurality of ribs, the first stop and the second stop of the at least one pair of stops being positioned to be spaced from one another when the portable electronic device case is in the open disposition, the first stop and the second stop of the at least one pair of stops being positioned to be oppositely facing when the portable electronic device case is in the closed disposition to allow for contact between the first stop and the second stop of the at least one pair of stops to maintain spacing between one or more first portions of the spine portion and one or more second portions of the spine portion.

20. The portable electronic device case of claim 19, wherein the spine portion includes but is not limited to a inner material layer having a first flexibility and an outer material layer having a second flexibility, the flexibility of the spine portion based at least in part on the first flexibility of the inner material layer and the second flexibility of the outer material layer.

* * * * *